May 10, 1966 D. J. RICKARD ETAL 3,250,210
CITRUS FRUIT HANDLING MACHINERY
Filed Oct. 6, 1964 13 Sheets-Sheet 1

INVENTORS.
DONN J. RICKARD
FRANKLIN K. HOLBROOK
THOMAS H. GILL
BY Paul A. Weilein
ATTORNEY

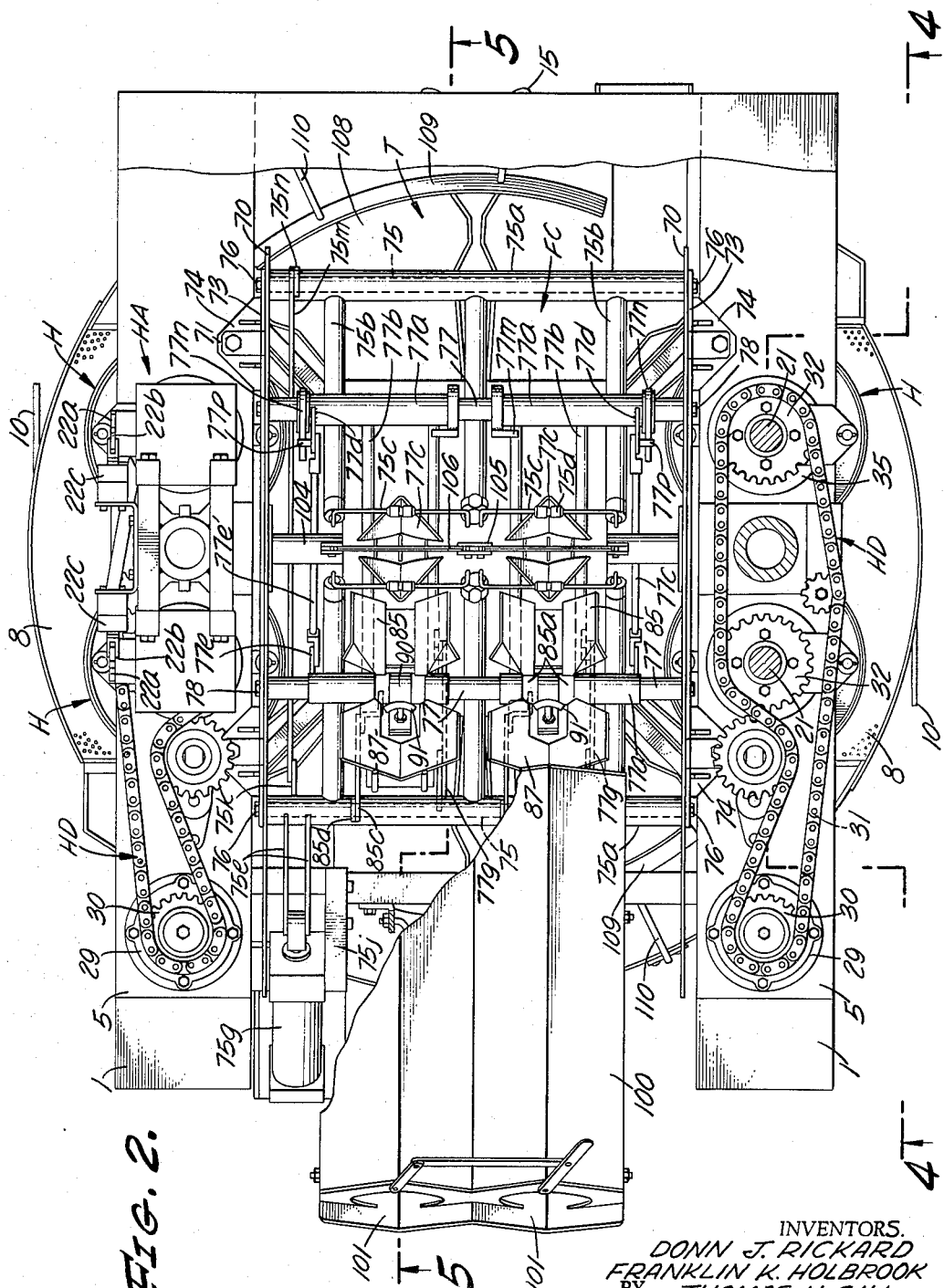

May 10, 1966 D. J. RICKARD ETAL 3,250,210
CITRUS FRUIT HANDLING MACHINERY
Filed Oct. 6, 1964 13 Sheets-Sheet 3
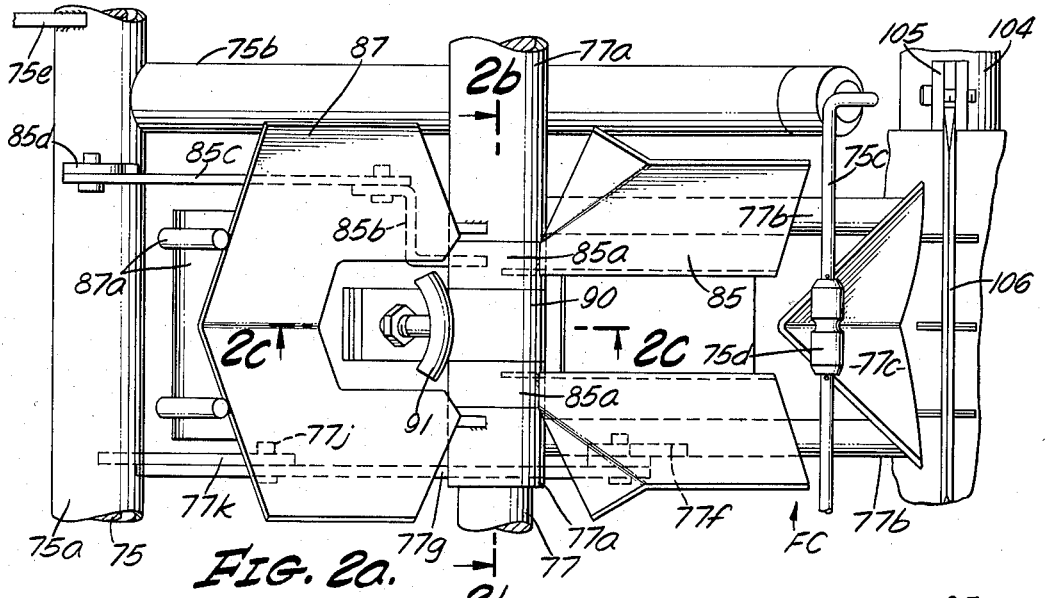
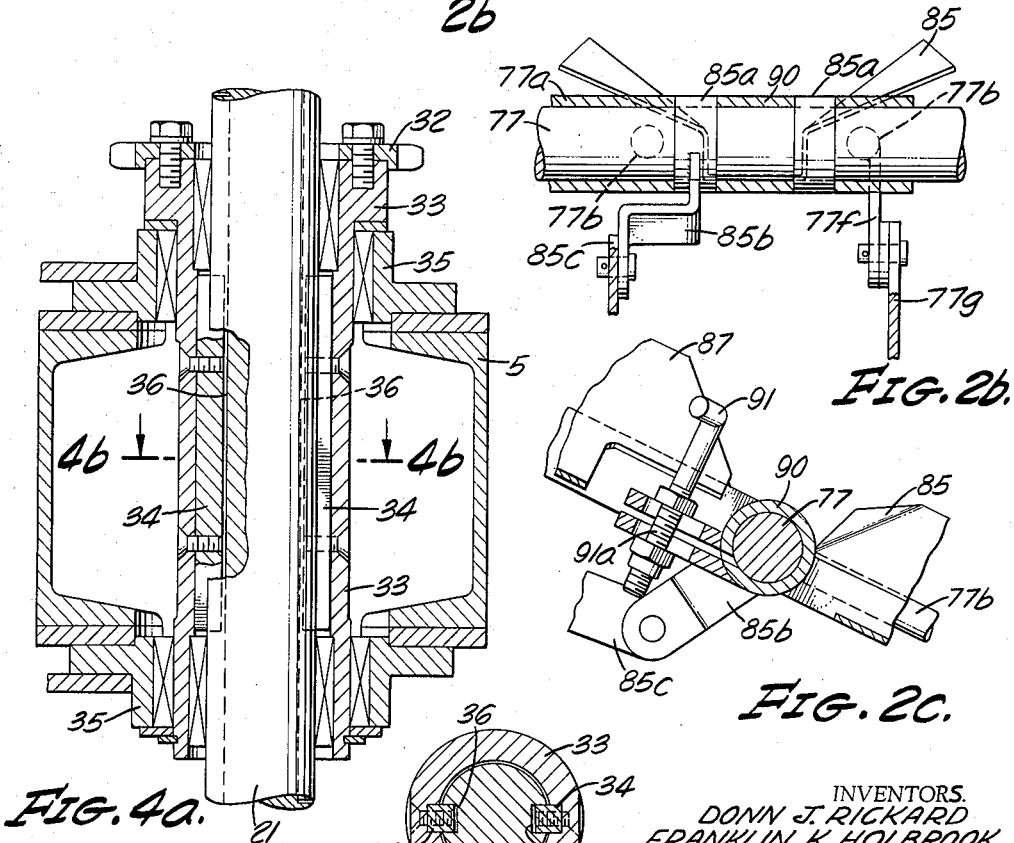
INVENTORS.
DONN J. RICKARD
FRANKLIN K. HOLBROOK
THOMAS H. GILL
BY Paul A. Weilein
ATTORNEY INVENTORS.
DONN J. RICKARD
FRANKLIN K. HOLBROOK
THOMAS H. GILL
BY Paul A. Weilein
ATTORNEY

INVENTORS.
DONN J. RICKARD
FRANKLIN K. HOLBROOK
BY THOMAS H. GILL

Paul A. Weilein
ATTORNEY

INVENTORS.
DONN J. RICKARD
FRANKLIN K. HOLBROOK
THOMAS H. GILL
BY Paul A. Weilein
ATTORNEY May 10, 1966  D. J. RICKARD ETAL  3,250,210
CITRUS FRUIT HANDLING MACHINERY
Filed Oct. 6, 1964   13 Sheets-Sheet 8

INVENTORS.
DONN J. RICKARD
FRANKLIN K. HOLBROOK
BY THOMAS H. GILL
Paul A. Weilein
ATTORNEY INVENTORS.
DONN J. RICKARD
FRANKLIN K. HOLBROOK
BY THOMAS H. GILL
Paul A. Weilein
ATTORNEY May 10, 1966 D. J. RICKARD ETAL 3,250,210
CITRUS FRUIT HANDLING MACHINERY
Filed Oct. 6, 1964 13 Sheets-Sheet 10

INVENTORS.
DONN J. RICKARD
FRANKLIN K. HOLBROOK
BY THOMAS H. GILL
Paul A. Weilein
ATTORNEY INVENTORS.
DONN J. RICKARD
FRANKLIN K. HOLBROOK
THOMAS H. GILL
BY Paul A. Weilein
ATTORNEY May 10, 1966   D. J. RICKARD ETAL   3,250,210
CITRUS FRUIT HANDLING MACHINERY
Filed Oct. 6, 1964   13 Sheets-Sheet 13

INVENTORS.
DONN J. RICKARD
FRANKLIN K. HOLBROOK
THOMAS H. GILL
BY Paul A. Weilein
ATTORNEY

United States Patent Office 3,250,210
Patented May 10, 1966

3,250,210
CITRUS FRUIT HANDLING MACHINERY
Donn J. Rickard, Glendora, and Franklin K. Holbrook and Thomas H. Gill, Whittier, Calif., assignors to Brown Citrus Machinery Corp., Whittier, Calif., a corporation of California
Filed Oct. 6, 1964, Ser. No. 401,815
46 Claims. (Cl. 100—53)

The present invention relates to citrus fruit handling machinery and more particularly to a machine adapted to cut and squeeze citrus fruit in such a manner that a uniform sampling of the quality of citrus fruit may be obtained as a guide to the determination of the value of a load of the fruit.

In the citrus juice industry it is the practice to take representative samples of loads of whole citrus fruit and squeeze such samples to obtain sample juice indicative of certain qualities of the fruit of the entire load, such as the volume of the fruit juice, the soluble sugar content of the fruit juice, and other factors determinative of the economic value of a given load of fruit. It is desirable under such circumstances to be able to obtain sample juice in a uniform manner independent of variation in whole fruit size, and moreover, it is desirable that a reasonable sample quantity of the fruit be treated to obtain the juice therefrom within a comparatively short period of time and with a minimum of manual handling.

In such operations, it is obviously necessary that the fruit be cut and that the juice be expressed from the cut fruit by the application of pressure, and the present invention contemplates a machine or apparatus whereby a substantial quantity of sample fruit may be rapidly handled and wherein the treatment of the cut fruit sections is uniform without regard to variations in fruit size within the range of the machine.

In keeping with the foregoing, it is an object of the present invention to provide fruit handling, cutting, and squeezing instrumentalities whereby whole citrus fruit may be fed into the machine and such fruit will be progressively cut and transferred to a position at which pressure may be applied to the cut fruit sections, and wherein the pressed fruit sections will be disposed of and the expressed juice collected in a convenient and expeditious fashion.

More particularly, it is an object of the invention to provide mechanism whereby fruit may be fed into a chute assembly and transferred from the chute assembly to a cutting station whereat the fruit is bisected, the halves being subsequently positioned at a location in the machine at which pressure is applied to the fruit half. Still more specifically it is an object to provide apparatus and control means therefor wherein the cutting and transfer operations, whereby the fruit is cut and subsequent fruit are transferred to a position to be cut, are effected simultaneously while at the same time pressure is being applied to previously cut fruit halves which have been previously positioned in the location whereat pressure may be applied to the fruit halves; and wherein the positioning of the cut fruit halves for the application of pressure thereto is effected concurrently with the sweeping away of previously pressed fruit halves.

Yet another object of the invention is to provide a cyclically operated machine wherein individual pressure applying means are operable to apply the same pressure to a plurality of cut fruit halves or sections regardless of variations in the size of the fruit, such pressure being applied for a controlled and predetermined period.

In accordance with the preceding object, it is a further object to provide control mechanisms whereby the machine will be rendered inoperative in the event that any one or more of the individual pressure applying means is for one reason or another inoperative or is in a position at which further cycling of the machine would be damaging thereto.

Still another object is to provide a citrus fruit juice expressing machine wherein a plurality of rotary expressing elements are movable into and out of pressure applying positions by fluid pressure operated means in a cyclical manner and wherein during the application of pressure to cut fruit sections by said pressure applying means, additional fruit is being cut and so located as to be subsequently positioned for squeezing when the fluid pressure operated pressure applying means are moved to inoperative position, positioning means being provided for similarly locating successive fruit sections in the same relative location in relation to the pressure applying means regardless of variation in fruit size, so that upon the application of pressure to the fruit sections by the pressure applying means, the successive fruit sections are similarly treated to remove juice therefrom. In such operations, one of the pressure applying elements may conveniently be and desirably is a grid or grill having small apertures for the passage of juice therethrough, so that the collected juice will be sufficiently finished, or free of pulp, rag and seeds, as to be in condition for testing of the juice.

Still another object of the invention is to provide a machine for handling and squeezing citrus fruit wherein citrus fruit cut sections are positioned between relatively movable pressure applying members, there being power driven means for effecting such relative movement of the pressure applying members, and the machine including means for moving one of the pressure applying members away from the other and toward the other cyclically in timed relation to the operation of means for positioning the cut fruit sections between the pressure applying members.

It is also an object of the invention to provide for use in a machine in accordance with the next preceding object, positioning means for engaging and moving cut fruit sections from one location to another location at which the fruit sections are precisely positioned with respect to pressure applying members, such positioning means including a novel relatively movable gripping finger assembly and means for operating the fingers to cause the same to close on and engage a fruit section and for opening the fingers when the fruit section is properly positioned.

A further object is to provide a machine for expressing juice from cut fruit sections wherein a relatively movable pressure applying member is driven by a source of power and wherein positioning means are intermittently operated by the source of power to move cut fruit sections into position between pressure applying members while the latter are spaced apart, there being means operable responsive to the means for driving the movable pressure applying member for controlling the operation of the positioning means and for controlling movement of the pressure applying means toward and away from one another in timed sequence.

A further object is to provide in an apparatus according to the next preceding object, whole fruit handling and cutting means operable in timed relation to the positioning and pressure applying means so that during the period that the pressure applying members are expressing juice from previously cut fruit sections, subsequent whole fruit is cut or bisected and during the period that the pressure applying members are spaced apart, the bisected fruit sections are engaged by the positioning means and moved to a position to be engaged between the pressure applying members.

Other objects and advantages of the invention will be hereinafter described or will become apparent to those siklled in the art, and the novel features of the invention will be defined in the appended claims.

In the accompanying drawings:

FIG. 2 is a top plan view of the invention with a portion of the fruit feed chute and rear housing broken away;

FIG. 2a is a fragmentary enlarged top plan view showing a typical fruit feed and handling mechanism;

FIG. 2b is a vertical section as taken on the line 2b—2b of FIG. 2a;

FIG. 2c is a fragmentary detail view in section as taken on the line 2c—2c of FIG. 2a;

FIG. 4a is an enlarged fragmentary detail view in section as taken on the line 4a—4a of FIG. 4;

FIG. 4b is a transverse section as taken on the line 4b—4b of FIG. 4a;

Like reference characters in the several views of the drawings and in the following description designate corresponding parts.

Figure 1:
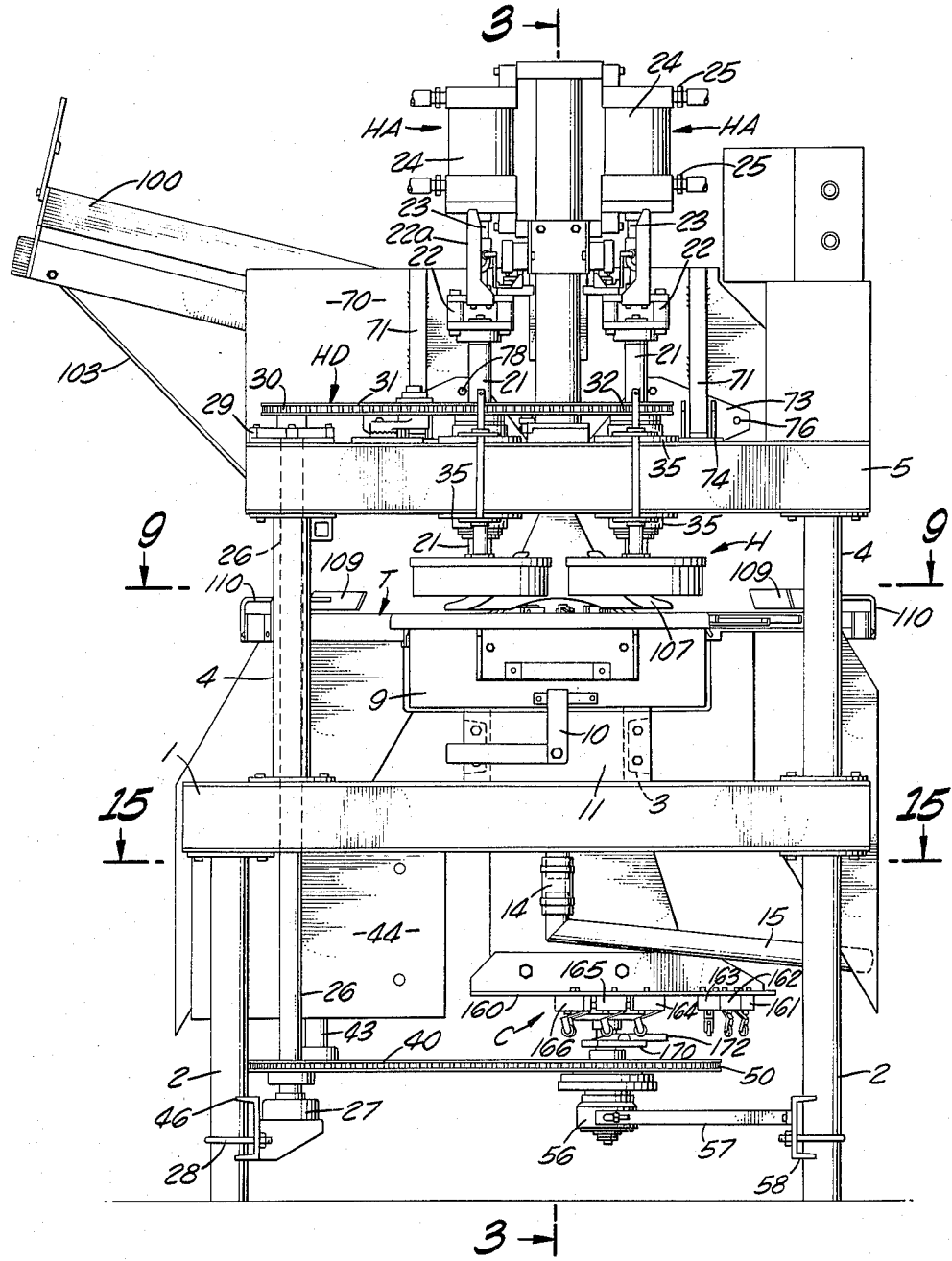
FIG. 1 is a side elevational view of a machine embodying the features of the present invention.
Figure 3:
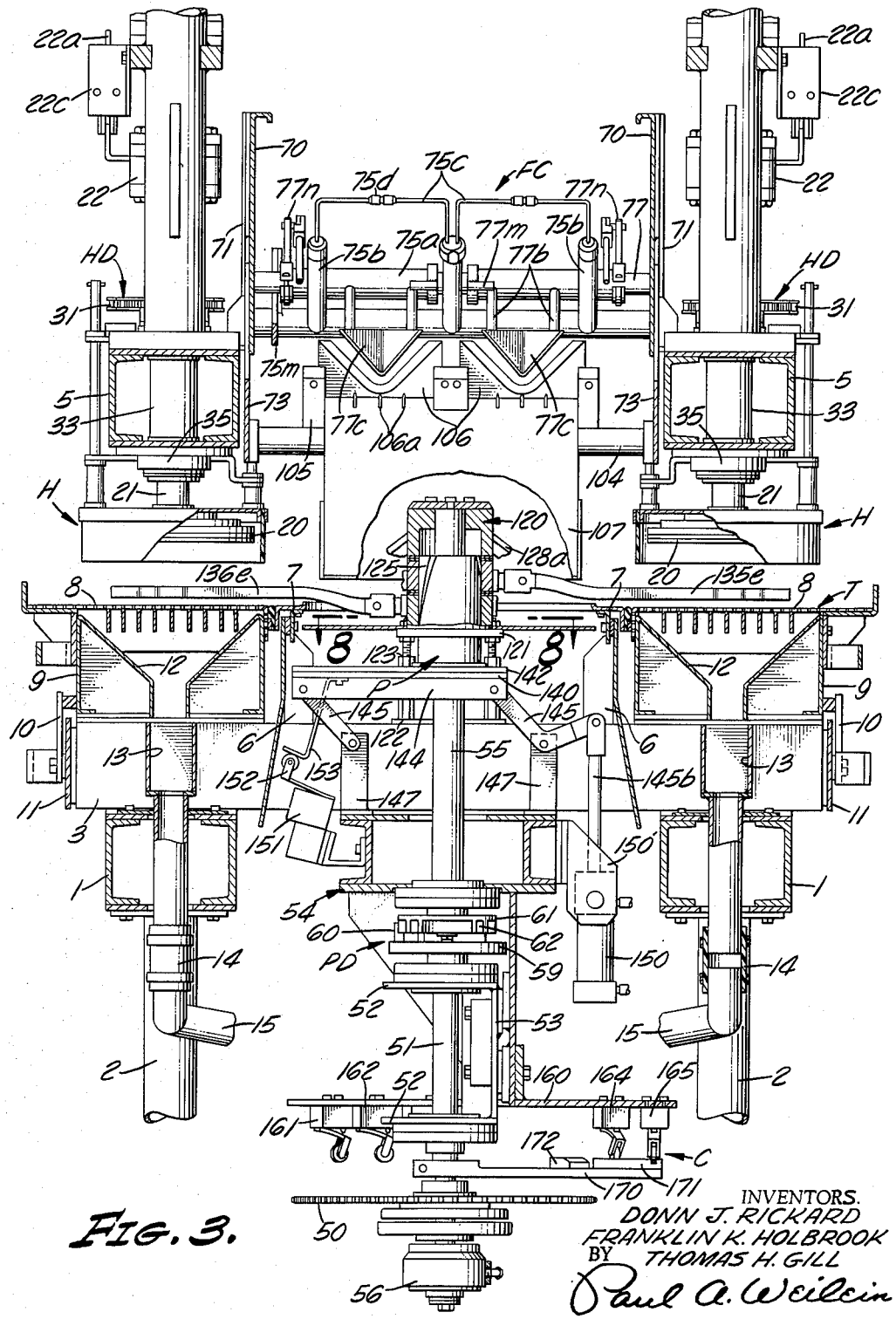
FIG. 3 is a fragmentary vertical sectional view taken substantially on the line 3—3 of FIG. 1 and illustrating the positioning drive and control mechanisms in relation to the pressure applying and juice extracting means.

Referring first to FIGS. 1, 2 and 3, the machine herein discloses as illustrative of the present invention includes a supporting frame structure which includes a pair of horizontally spaced beams 1 supported on vertical legs 2 and transversely interconnected by suitable structural cross members 3. Mounted atop the beams 1 and supported on posts 4 are upper beams 5 disposed in laterally spaced parallel relation.

The beams 5 support means generally denoted at H for applying pressure to cut citrus fruit sections, the means H being located beneath the beams 5. Above the beams 5 are disposed fluid pressure operated actuator means generally denoted at HA for effecting raising and lowering of the pressure applying means H. Supported also above the beams 5 is a drive means HD for driving the pressure applying means H as will more particularly appear hereinafter. Interposed in the space defined between the beams 5 and operatively supported by the beams is fruit handling and cutting means FC. Supported above the beams 1 is a fruit receiving table T for receiving fruit from the fruit cutting means FC and operatively associated with the table T is fruit positioning means generally denoted at P whereby to engage and move cut fruit sections received on the table T to a location at which the pressure applying means may engage the fruit to express juice therefrom. Disposed beneath the table T is positioner drive means generally denoted at PD for driving the positioning means intermittently rotatively relative to the table T, and disposed beneath the positioner drive means PD is control means generally designated at C for effecting control of the pressure applying means, the fruit cutting means, and the positioning means.

Figure 4:
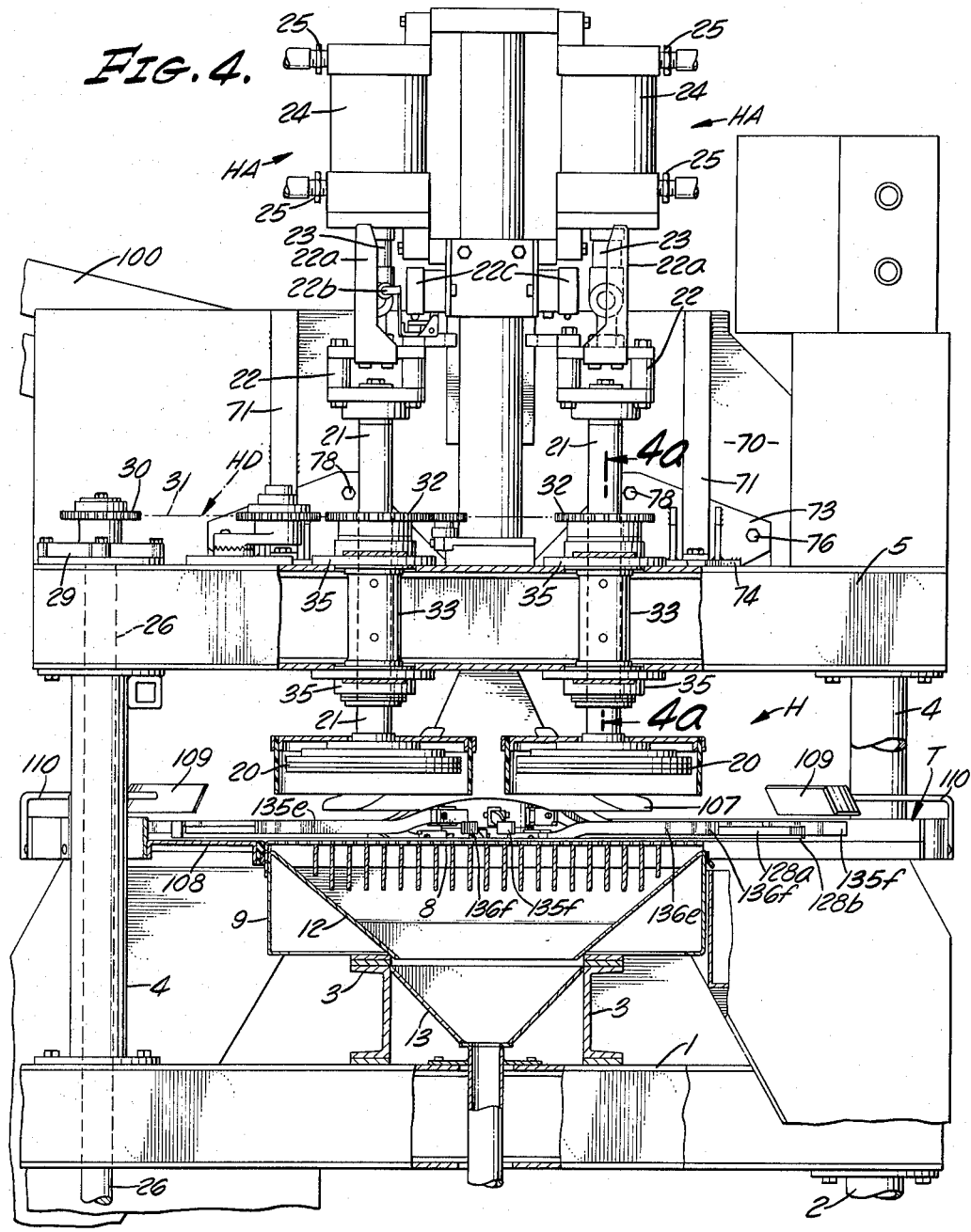
FIG. 4 is a view partly in side elevation and partly in section as taken on the line 4—4 of FIG. 2 and more particularly illustrating the pressure applying means and the drive therefor.

The table T is generally of circular form and is suitably supported above the cross members 3 by means of brackets 6 supported on the beams and connected to brackets 7 mounted beneath the table T. Included in the table T is a pair of diametrically opposite grids 8 which constitute members to engage the cut faces of fruit sections and through which the juice may be expressed from the sections. These grids are shown as having small apertures therethrough, so that the collected juice will be sufficiently finished, or free of pulp, rag and seeds, as to be in condition for testing of the juice. These grids are carried by removable drawer assemblies 9 which are slidable on the cross members 3, as seen in FIG. 4, and which are retained in place by pivoted retainers 10 respectively connected to an outer plate 11 which extends between the cross members 3, as seen in FIG. 1. Each drawer comprises in addition to the grid 8 a hopper 12 whereby juice is caused to flow into a juice receiving duct 13 which leads downwardly through the beams 1 and is connected by a coupling 14 to a juice conduit 15, the latter leading to any appropriate receptacle.

The pressure applying means H generally referred to above includes means movable relative to the grid 8 to engage and apply pressure to cut fruit sections or halves which have been previously positioned upon the grids 8. The pressure applying means comprises a plurality of individual reciprocal rotary pressure applying heads 20, each of the heads 20 being mounted upon a vertically reciprocable shaft 21 at the upper end of which is a universal connector 22 which is in turn connected to a rod 23 projecting from an air cylinder 24 and constituting the head actuator means HA. The air cylinder 24 is provided with inlet and outlet means 25 so that as is well known, the rod may be power actuated in either direction to cause reciprocation of the shaft 21 and hence reciprocation of the head 20 toward and away from the associated grid 8.

Means are also provided for effecting rotation of the head shaft 21 of each of the head assemblies, and such means generally referred to above as the head drive means HD comprises a pair of drive shafts 26 each of which extends through one of the posts 4 and beams 1 and is journalled at its lower end in a bearing assembly 27 supported by clamping means 28 on one of the legs or posts 2. The shafts 26 extend upwardly through the beams 5 and are journalled in bearings 29 carried by the latter. At its upper end each of the shafts 26 carries a drive sprocket 30 adapted to drive a drive chain 31. This drive chain is engaged with a pair of driven sprockets 32 which, as seen in FIGS. 4, 4a and 4b, are respectively carried by rotary drive bushings 33. Means such as keys 34 interconnect the drive bushing 32 with the associated head shaft 21 whereby rotation transmitted to the sprockets 32 will be transmitted to the head shafts 21 to effect rotation of the fruit engaging heads 20. The bushings 33 are journalled in bearings 35 and extend through the beams 5. It will be noted that the keys 34 engage in elongated keyways 36 in the respective head shafts 21 so as to allow, during rotation of the heads 20, relative longitudinal or axial movement of the head shafts 21 responsive to the application of pressure to one end or the other of the cylinders 24.

For a reason which will hereinafter more fully appear, each of the head shafts 21, and more particularly in the illustrative embodiment, each of the universal connectors 22 is provided with a cam member 22a engageable with a control arm 22b of a control device 22c which, in the illustrative embodiment, are constituted by valves which are normally open and which are closed upon engagement of the cams 22a with the control members 22b when the heads 20 are elevated above the table T.

Figure 15:
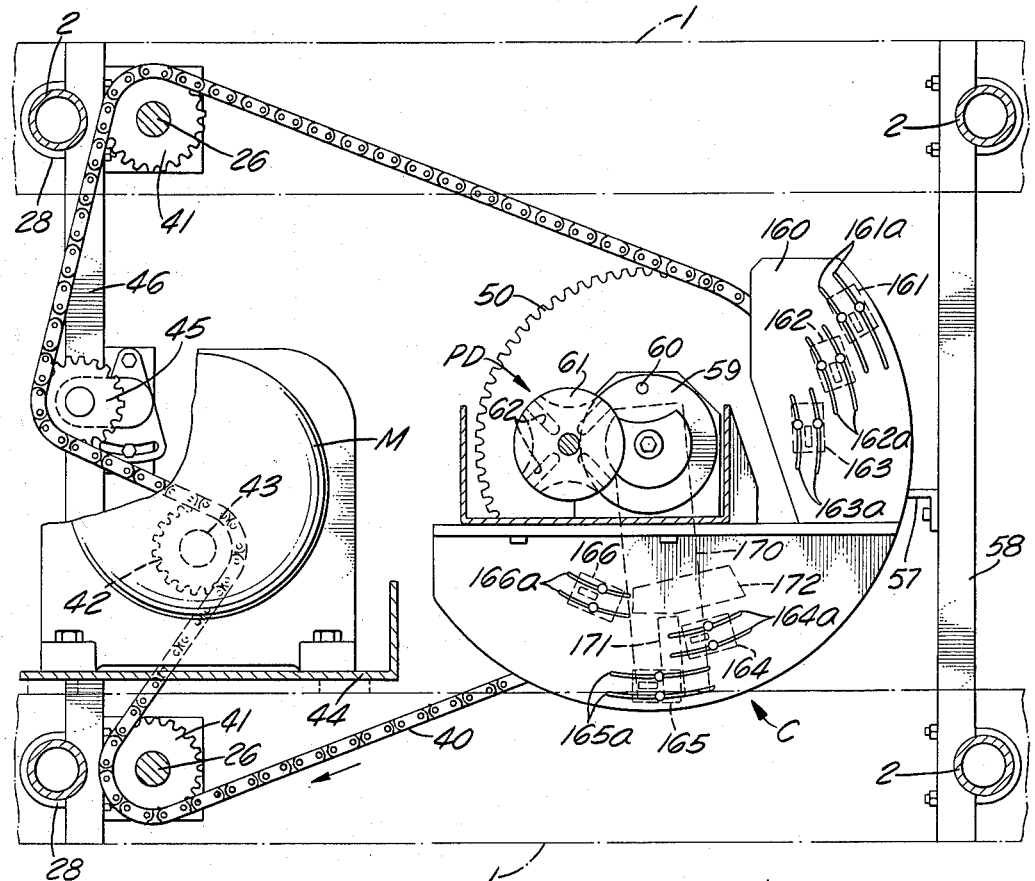
FIG. 15 is a horizontal sectional view as taken on the line 15—15 of FIG. 1.
Figure 8:
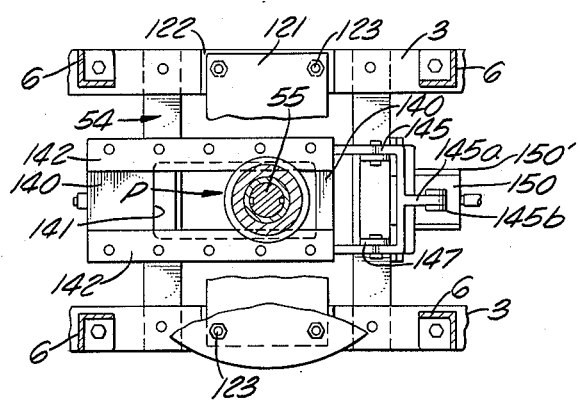
FIG. 8 is a horizontal sectional view as taken on the line 8—8 of FIG. 3.

As seen in FIGS. 1 and 15, each of the shafts 26 is driven by a drive chain 40 engaging with sprockets 41 on the shafts 26 above the lower bearings 27, a run of the chain 40 being engaged by a motor sprocket 42 mounted on a motor shaft 43, the latter being driven by a motor or other source of power M which is suitably supported as by a mounting plate 44 to one of the beams 1. A chain tightening idler sprocket 45 is preferably provided and mounted upon a support 46 extending between the legs or posts 2.

The chain 40 also drives the above mentioned positioning drive means PD and also effects operation of the control means C. Thus, the chain 40 engages a sprocket 50 mounted at the lower end of a driven or power shaft 51 which, as best seen in FIG. 3, is mounted in spaced bearings 52, these bearings being carried by a bracket 53 which depends from a frame structure 54 mounted beneath the cross members 3.

Figure 5:
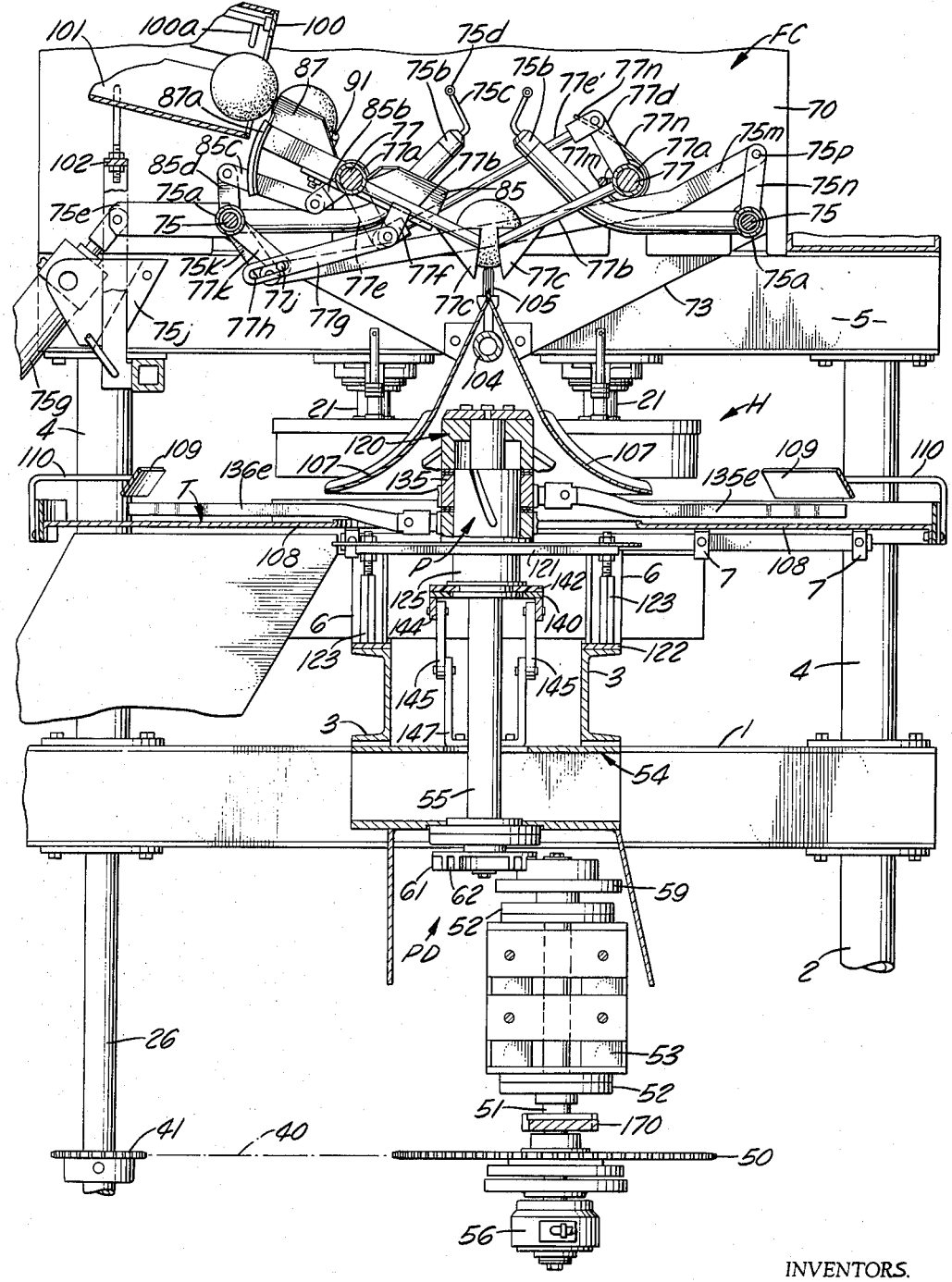
FIG. 5 is a fragmentary vertical sectional view as taken substantially on the line 5—5 of FIG. 2 and more particularly illustrating the fruit handling and cutting means in one stage of its operation.

Upon reference to FIG. 5, it will be noted that the shaft 51 is laterally displaced from the center of the machine and more particularly it is laterally displaced from an indexing or positioning shaft 55 which, in a manner to be described, effects angular movement of the positioning means P.

A normally engaged air clutch assembly 56 is mounted on the lower end of shaft 51 and, as shown in FIG. 1, has its housing held stationary by a member 57 connected to the clutch 56 at one end and at its other end connected to a clamp 58 suitably connected to one of the legs 2 of the machine. The air clutch 56 is normally engaged by air pressure so that so long as the source of power on motor M is operating and air is supplied to the clutch, the drive chain 40 will effect continuous rotation of the shaft 51 through the clutch 56.

At the upper end of the shaft 51 it is provided with a support plate 59 fixed to the shaft for rotation therewith and having an upstanding pin 60 mounted at the periphery of the plate 59 for intermittent engagement with a Geneva wheel 61 having radial slots 62 into which the pin will move progressively as the plate 59 rotates, there being four such slots 62 so that the Geneva wheel 61 will be caused to rotate one-fourth of one revolution per revolution of the shaft 51. Accordingly, the indexing shaft 55 will be caused to rotate one-fourth revolution per revolution of the shaft 51, and the positioning means P will correspondingly be indexed one-fourth revolution per revolution of the shaft 51, as will hereinafter be referred to in greater detail.

Referring now to the fruit cutting means which is more particularly illustrated in FIGS. 2 through 7, it will be noted that these fruit cutting means are located between a pair of laterally spaced walls 70 which project upwardly between the pressure applying head actuators HA and which are mounted on the upper beams 5 by means of brackets 71 (see FIG. 4).

Figure 6:
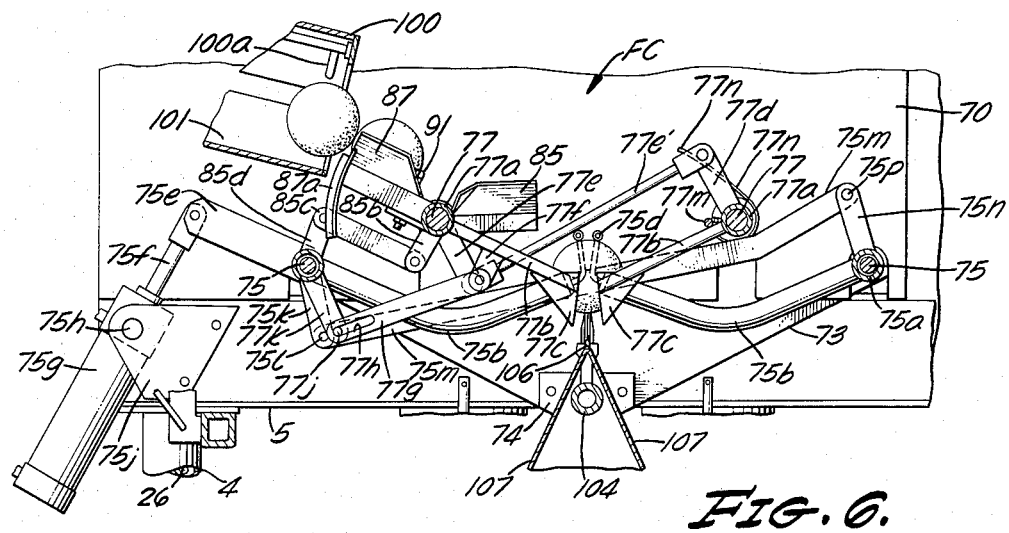
FIG. 6 is a fragmentary detailed view illustrating the fruit handling and cutting mechanism of FIG. 5 in an advanced operating position.

The fruit cutter assembly comprises a pair of support plates 73 having outstanding tabs 74 (see FIG. 2) adapted to be secured in a suitable fashion to the upper beams 5. Extended transversely between the support plates 73 is a pair of spaced shafts 75, each being fixedly mounted between the plates 73 by suitable fasteners 76. Also extended between the support plates 73 is a pair of spaced apart shafts 77 which are disposed between the shafts 75 and in slightly elevated relation to a plane intersecting the shafts 75 (as seen in FIG. 6, for example). These shafts 77 are fixed to the plates 73 by means of suitable fasteners 78.

Rockably mounted upon each of the shafts 75 is a sleeve 75a having thereon a series of transversely spaced outwardly projecting pusher arms 75b, the pusher arms on the opposing portions of shafts 75 extending toward one another and supporting at their free ends roller supporting members 75c, having thereon pusher rollers 75d.

Figure 7:
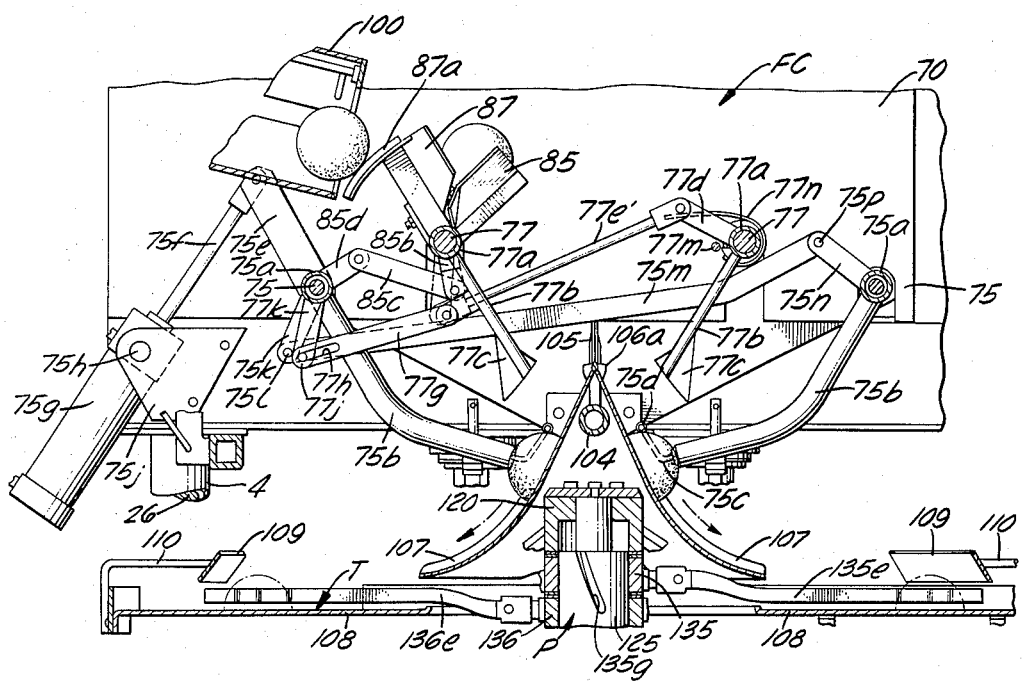
FIG. 7 is a view corresponding to FIG. 6 illustrating a further step in the operation of the fruit handling and cutting mechanism.

Projecting outwardly from one of the sleeves 75a and more particularly the left hand sleeve 75a (as seen in FIGS. 6 and 7) is a crank arm 75e, to the outer extremity of which is connected the working rod 75f of a fluid pressure operated actuator cylinder 75g. The latter is pivotally mounted on trunnions 75h in a supporting bracket 75j which is suitably connected to the adjacent upper beam 5. Also projecting from the last mentioned sleeve 75a is a crank arm 75k which is pivotally connected as at 75l to a drag link 75m, the latter being connected to a crank arm 75n by means of a pivot 75p, this crank arm 75n being fixed to the other rockable sleeve 75. Accordingly, pivotal motion of the crank arm 75e will effect corresponding rotation of both of the rockable sleeves 75a whereby to effect corresponding pivotal motion of the pusher arms 75b.

Disposed on each of the shafts 77 is a pair of longitudinally spaced rockable sleeves 77a having fixed thereon and projecting toward the other shaft 77 support arms 77b at the outer end of which is supported a generally triangular fruit centering cup member 77c. The pairs of rockable sleeves 77a on the respective shafts 77 are operatively interconnected so as to be caused to rotate in opposite directions whereby the cup members 77c may be moved away from one another.

Means for so interconnecting the rockable sleeves 77a comprises oppositely extended lever arms 77d and 77e on the opposing sleeves 77a, and a link 77e' interconnecting the lever arms 77d and 77e carried by one of the cup supporting arms 77b adjacent the lever arms 77e of the rockable sleeve 77a. Shown at the left hand side in FIG. 5, is a connector arm 77f to which is connected a pull link 77g, the latter having in its outer end an elongated slot 77h in which is slidably disposed a pin 77j supported at the outer end of a crank lever 77k carried by the rockable sleeve 75a on the left hand shaft 75 as viewed in FIG. 5, whereby there is an effective lost motion connection between the pull link 77g and the rockable sleeve 75a just referred to which will enable a degree of pivotal movement of sleeves 75a and during which movement the sleeves 77a and the cup elements 77c supported thereon are permitted to partake of limited free movement, and following which the sleeves 77a and the cup elements 77c will be positively moved in the same direction as the pusher arms 75b.

Means are provided for limiting movement of the cup members 77c toward one another and means are also provided for normally maintaining the cup members 77c in their respective positions nearest one another. Accordingly, there is fixed on one of the shafts 77 (namely, the shaft viewed at the right hand side of FIG. 5 and at the top of FIG. 2, for example) a pair of stop elements 77m disposed for engagement by the arms 77b adjacent thereto, and a pair of springs 77n are provided on this shaft 77 and have an end engageable with a pin 77p projecting outwardly from the respective lever arms 77d on the sleeves 77a. Since the sleeves 77a on both of the shafts 77 are interconnected by the links 77e as previously described, the springs 77n and stops 77m are effective to normally maintain both of the cup elements 77c in the relative positions shown in FIG. 5, and it will be recognized that movement of the cup elements away from one another is against the bias of the springs 77n.

Referring now to FIG. 2, it will be noted that the rockable sleeves 77a on the lowermost shaft 77 (this being the left hand shaft 77 as viewed in FIG. 5) are split to provide a space between the ends of these sleeves 77a. In this space in each of the sleeves 77a is mounted a pivotal guide cup 85 which is generally of V-shape and has at one end supporting rings 85a adapted to be pivotally disposed on the shaft 77. Means are provided for effecting pivotal movement of these guide cups 85 between the downwardly extended position shown in FIG. 5, and the upwardly extended position shown in FIG. 7, such movement being correlated to movement of a fruit feeding cup 87 which is also of generally V-shape and which is integrally connected with the spaced portions of the sleeves 77a. Such movement of the feeding cups 87 is between the fruit receiving positions shown in FIG. 7 and the dumping positions shown in FIG. 5. Movement of the guide cups 85 is effected by means of a lever 85b projecting from the support rings 85a and connected at its outer end to a pull link 85c, the latter in turn being connected to a crank arm 85d projecting from the adjacent rockable sleeve 75 whereby movement of the guide cup 85 is a function of pivotal movement of the adjacent rockable sleeve 75.

Since movement of the cups 77c is also responsive to movement of the rockable sleeves 75a, through the lost motion connection between the pull links 77g and the crank arm 77k, and since the loading cups 87 are integrated with the rockable sleeves 75a as just described, it will be apparent that movement of the loading cups 87 is also effected by rocking movement of the adjacent sleeve 75a, but as seen in FIG. 7, movement of the loading cups 87 in the position shown in the view occurs positively when the pin 77j of the just mentioned lost motion connection engages at the outer end of the slot in the pull link 77g.

Also mounted on the shaft 77, viewed at the left hand side of FIG. 5, and between each of the sets of loading cups and guide cups, is a relatively stationary stop member 90 having an upstanding stop projection 91 which, in a manner to be presently described, will engage and limit movement of a whole fruit, the loading cups 87 being adapted to move said fruit over the stop 91 to dispose the fruit in the guide cups 85. The stop member 90, as seen in FIG. 2c, may include a split clamp secured on shaft 77 by means of a threaded fastener section 91a of the stop member projection 91.

Associated with the fruit handling means just described is a suitable chute 100 having laterally spaced channels 101 for guiding rows of fruit toward the stop elements 91, the latter being so disposed as to allow the passage of but a single fruit into the loading cups 87, and the loading cups having at their outer ends a baffle 87a which, as shown in FIG. 7, will upon movement of the loading cups to the position shown in that view, prevent the passage of the succeeding fruit from the chute 100. This chute 100 may be suitably mounted adjacent the fruit cutting means FC by means of a suitable bracket 102 adjacent the discharging end of the chute (FIG. 5) and by means of a suitable strut 103.

Mounted between the support plates 73 on a support 104 is a cutter knife assembly 105 which provides a pair of knives 106 facing upwardly between the fruit centering cups 77c so as to engage a fruit as it is forced downwardly between the cups by pusher arms 75b. The knife assembly may also include slitting blades 106a which project from the side of knives 106 to slit the cut face of the fruit halves as the halves move downwardly thereover.

Downwardly and outwardly extended guides 107 are provided to guide the cut fruit halves which will gravitate to receiving decks 108 forming portions of the table T located in angularly spaced relation to the juice expressing grids 8. Momentum of the cut fruit halves will carry them into engagement with arcuate stops 109, as shown in FIG. 7, these stops being supported on arms 110 suitably affixed to the outer periphery of the table T. The positioning means P previously referred to is adapted to move the cut fruit from the delivery decks 108 to the grids 8.

Thus, as seen in FIG. 3 for example, at its upper end the positioner shaft 55 extends into a positioning head 120 of the positioning means P. The positioner head assembly is shrouded beneath the guides 107 and includes a mounting plate 121 supported atop the cross members 3 on a base plate 122, having upstanding adjustable screw supports 123, extending upwardly and connected to the mounting plate 121.

Referring now more particularly to FIGS. 11–14, the mounting plate 121 has an opening 124 in which is reciprocal and rotatable a drive bushing 125. Bushing 125 has a pair of keyways 126. Slidable in the keyways 126 is a pair of keys 127 suitably secured in a key slot 55a in positioner shaft 55 by means of screw fastenings or the like whereby rotation of the shaft 55 is imparted to the bushing 125. Atop the shaft 55 the head assembly 120 includes an inverted cup-like member or cap 128 having its skirt disposed about the upper extremity of the bushing 125 and having a closure 129 secured to and overlying the upper end of the cap 128, there being a key 130 secured in the keyway 55a of shaft 55 as by a screw fastening and engaged in a key slot 131 in the cap 128 whereby the cap will rotate with the shaft 55.

Rotatably disposed about the bushing 125 is an upper positioning finger support ring 135 and a lower positioning finger support ring 136, there being suitable bearings 135a and 136a between the rings 135 and 136 and the bushing 125 and, if desired, there also being suitable thrust bearings 137 interposed between the finger support rings and between the latter and the cap above the support ring 135 and below the support ring 136.

In angularly spaced locations about the positioning finger support ring 135 is a plurality of outstanding support elements 135b having seats 135c for a support lug 135d carried at the inner extremity of an outwardly extended resilient positioning finger 135e. Correspondingly, the positioning finger support ring 136 is provided with a plurality of supports 136b having seats 136c for the reception of the lugs 136d at the inner extremity of positioning fingers 136e. The supports 135b and 136b are arranged in substantial vertical alignment but extend at slightly divergent angles. In the present embodiment there are eight positioning fingers 136e carried by ring 135 and eight positioning fingers 136e carried by ring 136, and upon reference to FIG. 9, it will be noted that a finger 135e in combination with a finger 136e carried by the respective finger supports 135b and 136b in the next adjacent angularly spaced location constitute a pair of cooperative fingers, the finger 135e having a fruit engaging depression 135f and the finger 136e having a fruit engaging depression 136f whereby upon movement to the positions shown in FIG. 10, the fingers 135e and 136e will cooperate to grip between the depressions a fruit section.

Between alternate pairs of the fruit positioning fingers is a wiper arm 128a projecting radially from the head or cap 128 and having wiper means 128b adapted to engage the grids 8 as the head 120 is caused to index, as will hereinafter more fully appear.

Figure 9:
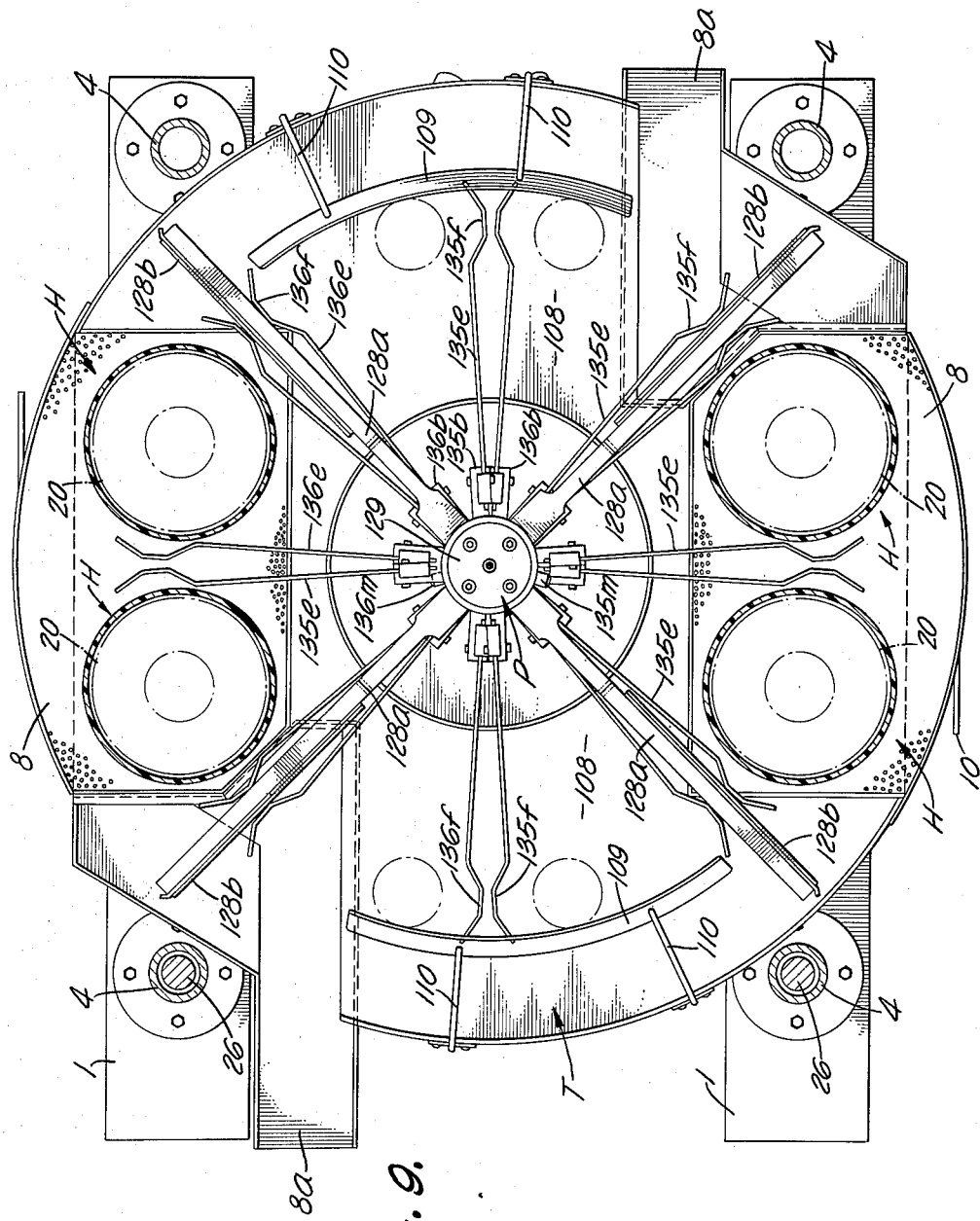
FIG. 9 is a horizontal sectional view as taken on the line 9—9 of FIG. 1 showing the positioning finger means in retracted positions.
Figure 10:
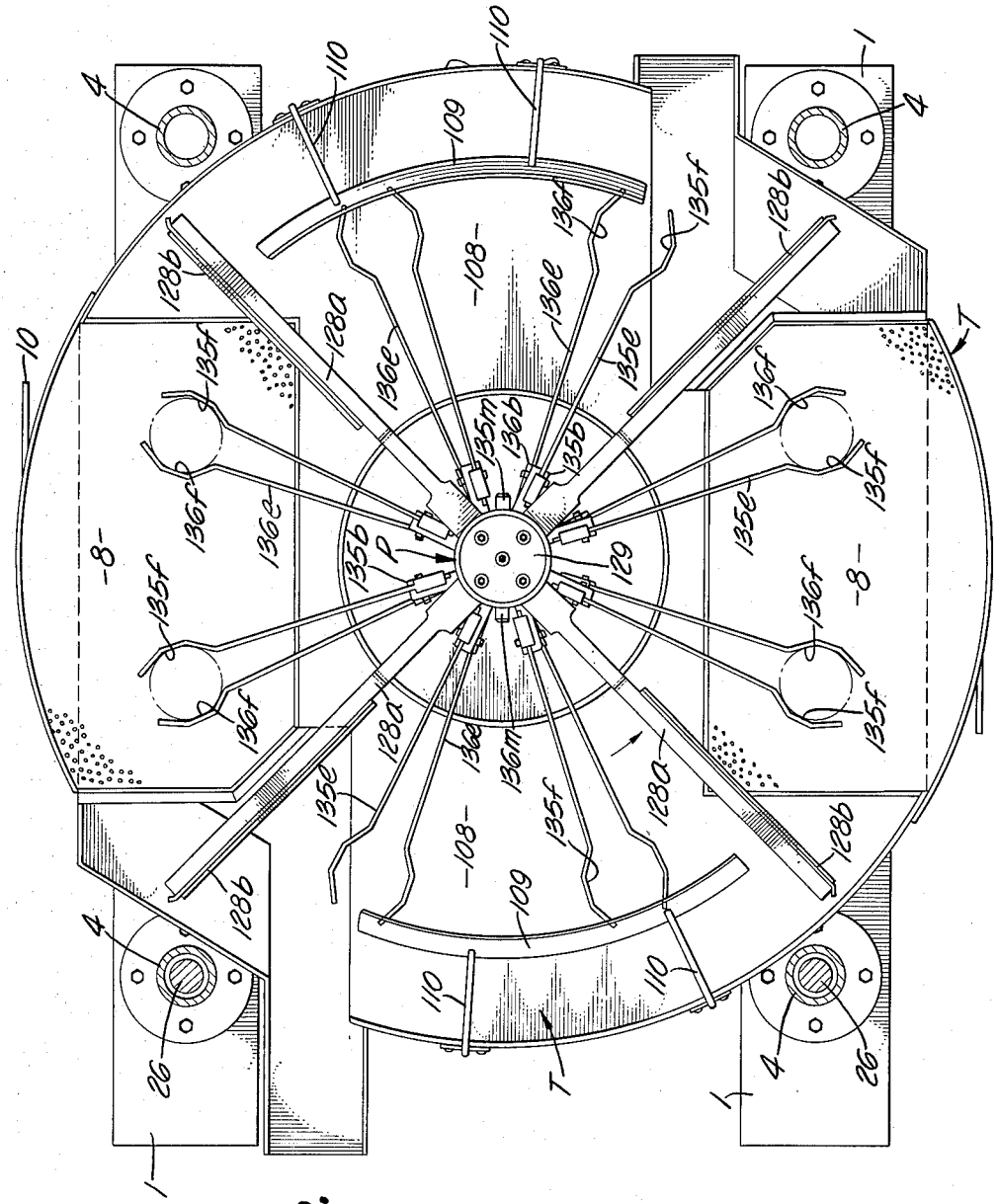
FIG. 10 is a view corresponding to FIG. 9 showing the positioning finger means in closed positions.

Included within the head assembly 120 is means for effecting intermittent alternate or opposite angular motion between the finger support ring 135 and the finger support ring 136, whereby the fingers 135e and 136e carried by their respective rings will be moved from the positions shown in FIG. 9 to the position shown in FIG. 10. Such means comprises a pair of helical cam slots 135g and 136g formed in the outer surface of the bushing 125, together with followers 135h and 136h, which are carried by the respective finger support rings 135 and 136.

Figure 14:
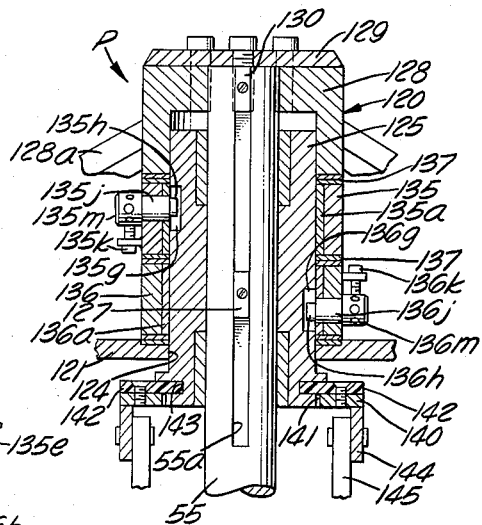
FIG. 14 is a vertical sectional view as taken on the line 14—14 of FIG. 11.

As seen in FIG. 14, the followers 135h and 136h are preferably adjustable within the respective cam slots 135g and 136g. For effecting adjustment, the respective followers are formed on the end of an adjuster shaft 135j and 136j and the respective adjuster shafts extend through radial openings in the rings 135 and 136 and have the followers 135h and 136h mounted or provided at the inner end of the adjuster shaft in eccentric relation thereto. Therefore, angular adjustment of the adjuster shaft 136j, for example, will effect displacement of the follower 136 and consequent slight angular adjustment of the ring 136 so as to adjust the relative angular dispositions of the fingers 136e carried by the ring 136. Similar adjustment may be effected in the case of fingers 135e carried by ring 135. In addition, means in the form of locking screws 135k and 136k are respectively provided for engagement with the angularly spaced apertures in heads 135m and 136m on the respective adjuster shafts 135j and 136j.

As previously mentioned, the bushing 125 is reciprocal within the base plate or mounting plate 121 and upon such reciprocation it will now be recognized that the cam slots 135g and 136g will move longitudinally relative to the followers therein to cause relative angular motion of the positioning finger support rings 135 and 136.

Means are provided for effecting such reciprocation of the bushing 125 and in the illustrative embodiments such means comprises a parallel link and slide assembly. This slide assembly includes a plate 140 having an elongate opening 141 through which the positioner shaft 55 extends. Suitably carried by the plate 140 are slide rails 142 which are disposed in parallel relation at opposite sides of the opening 141 and have their inner edges slidable in a groove 143 formed in the lower extremity of the bushing 125. At opposite ends of the plate 140 it is provided with side walls 144, at the opposite ends of each of which is a pair of parallel links 145. The links 145 are pivoted as at 146 to upstanding supports 147 mounted on the beams 1 between the cross members 3, as best seen in FIG. 5. One of the links 145 is an actuating link and has formed as a part thereof a lever arm 145a to the outer end of which is connected the operating rod 145b of a positioning finger actuator cylinder 150 which, as seen in FIG. 3, is supported by a bracket 150' supported on the box frame 54.

It will now be apparent that the parallel links 145 will effect vertical elevation and lowering of the plate 140 upon operation of the actuator cylinder 150, and as the rails 142 slide in the groove 143 of the bushing 125 in the positioner head 120, the bushing 125 will be caused to move vertically upward and downward to effect relative angular movement between the positioning fingers previously referred to. It will also be apparent that the foregoing relative angular motion of the fingers is independent of rotation of the positioner shaft 55, which, as previously described, rotates intermittently pursuant to engagement of the drive pin 60 in the slots 62 of the Geneva wheel 61.

Referring to FIG. 3, it will be noted that there is a control device generally designated 151 having an actuator arm 152 engageable by an element 153 fastened to the plate 140 of the parallel linkage device just described. It is the function of the control device 151 to be engaged by the element 153 when the plate 140 is in the position shown in FIG. 3 which is the lowermost position and in which position the fingers 135e and 136e will be in the position shown in FIG. 9, that is, with the cooperative pairs of fingers open.

In the operation of the machine, it is desired that whole fruit be fed into the chute 100 and be progressively loaded into the fruit centering cups 77c, forced over the cutting knives to separate the whole fruit into halves which will slide downwardly over the guides 107 onto the delivery decks 108 at diametrically opposite positions in the machine, whereat the cut fruit halves will be engaged by the positioning fingers 135e and 136e and moved into positions upon the grids 8 lying directly beneath the axis of the rotary pressure heads 20, whereupon the heads 20 will be moved downwardly to engage and press the fruit from the cut fruit sections, and thereafter the heads will be elevated as the spent fruit sections are swept from the grids 8 to discharge chutes 8a which, as shown in FIG. 9, lead to the edge of the respective grids 8 and away from the latter so that the spent fruit sections will be discharged to an appropriate receptacle.

Inasmuch as the machine is to operate cyclically, it will be understood that it is desired that as the heads 20 are engaged with and expressing juice from previously cut fruit sections, the fruit cutting means FC may be operating to cut additional fruit sections. In order to effect the cyclical and timed operation of the machine, the control systems of FIGS. 16 through 19 are employed, and in the respective control systems are control elements which, as shown in FIGS. 3 and 15, are adapted to be operated responsive to rotation of the drive shaft 51.

Accordingly, there is disposed adjacent the drive shaft 51 a support plate 160 mounted on the supporting means 53 for the bearings 52 which support the shaft 51. This plate at 160 has disposed therebeneath a series of radially and circumferentially spaced control devices. Referring to FIG. 15, the plate 160 is seen to have a control device 161 which will be characterized as the "Heads Up" control; next in the circumferential series is a "Clutch" control device 162; next in the circumferential series is a "Close Arms" control 163; following this is an "Open Arms" control 164; following the open arms control is a "Heads Down" control device 165; and last in the series is a "Slicer" control device 166. In the illustrative embodiment, each of the control devices is preferably adjustably mounted for movement circumferentially of the series by means of elongated arcuate slots 161a, 162a, 163a, 164a, 165a and 166a, respectively.

Means are provided for operating the control devices 161 through 166 in sequence. Accordingly, as best seen in FIGS. 3 and 15, there is an arm 170 mounted upon the shaft 51 between chain sprocket 50 and the lower bearing 52 and projecting radially. Disposed upon the arm 170 is a tripping bar 171, which also extends radially a sufficient extent to engage operator elements depending from the heads up control and the clutch control elements 151 and 162, respectively, as well as to engage the arms open control and the heads down control elements 164 and 165, respectively. Spaced radially inward from the member 171 is a cam block 172 mounted on the arm 170 so as to engage the close arms element 163 as well as the slicer control element 166. The circumferential extent of the cam block 172 determines, as will hereinafter more fully appear, the period during which the slicer control is effective to cause operation of the slicing means.

Figure 16:
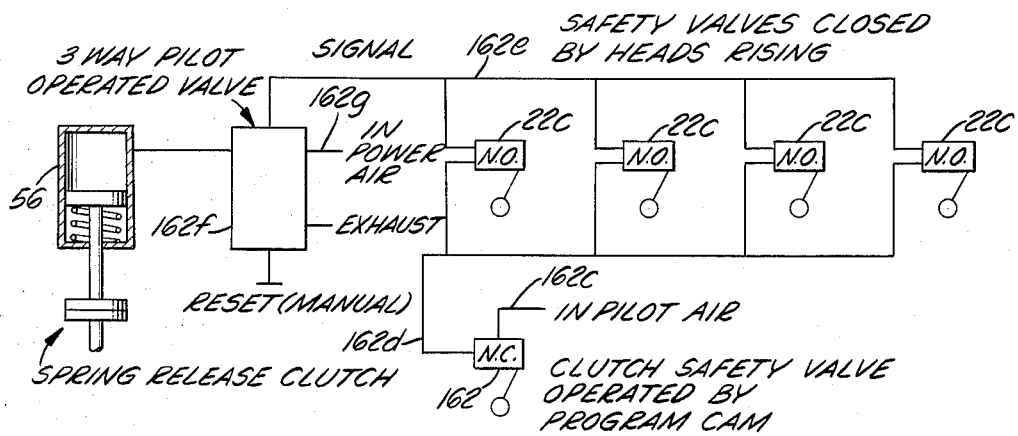
FIG. 16 is a diagrammatic view illustrating the air clutch control system.

Referring now to FIG. 16, there is illustrated a control system for the air clutch 56 previously referred to, and in which is the clutch control element 162. In the illustrative embodiment the control element 162 is a normally closed pilot valve having an air inlet line 162c, there being a line 162d leading from the normally closed valve 162, which is in parallel with each of the control valves 22c which, as heretofore described, are operable by the cams 22d carried by the head shafts 21. These control valves 22c are normally open, but are closed by the cam 22a when the heads are up. The common line 162e leads from the valve 162f to the pilot operated valve 152f through which passes a line 162g for conducting air to the air operated clutch 56 to maintain the same in engagement. The pilot valve 162f is conventional and is such that air conducted thereto by the line 162e will close the line 162g and allow exhaust of the clutch operating air so as to disengage the clutch. It will now be recognized that as the operating arm 170 of the control means C, and more particularly the actuator element 171 thereon, operates the control element 162c to open this normally closed valve, pilot air will be admitted to the pilot operated control valve 162f only if one of the normally open valves 22c remains open, indicating that one or more of the head shafts 21 is not elevated, and in the latter event, the air clutch will be spring disengaged upon exhaust of the air therefrom.

Figure 17:
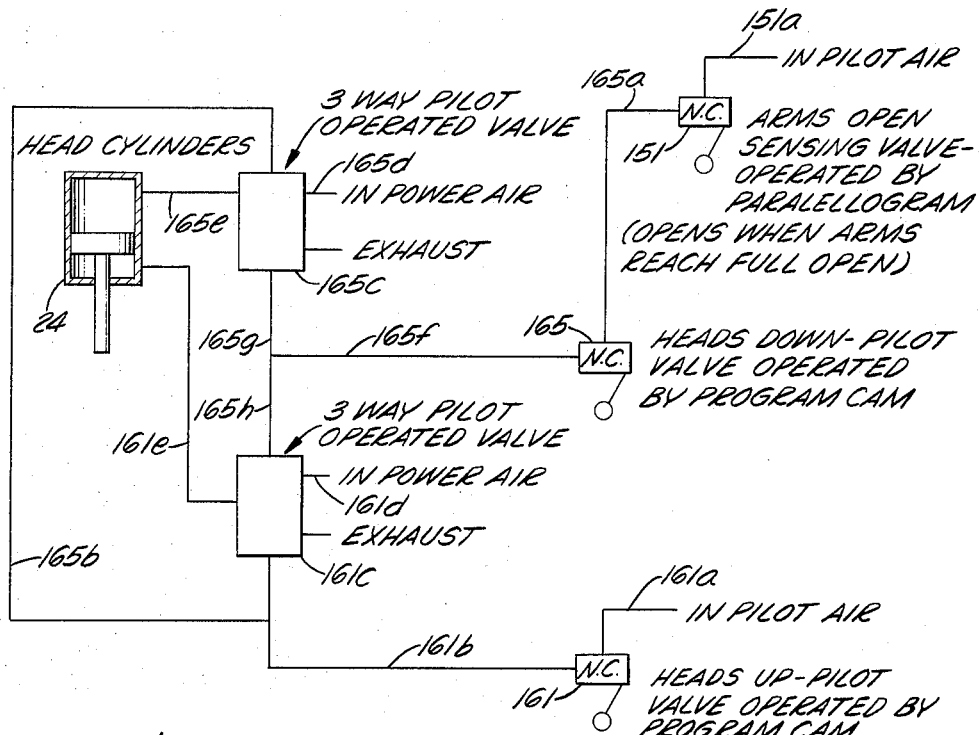
FIG. 17 is a diagrammatic view illustrating the pressure applying head control system.

Referring now to FIG. 17 wherein the control system for the operator cylinders 24 of the head actuator mechanism means HA is shown, it will be noted that this system includes the control elements 161 and 165 which are normally closed valves operable by the revolving arm 170 as referred to above, and also includes the control element 151 which is a normally closed valve operable responsive to the parallel linkage mechanism being moved downwardly so as to open the gripping fingers (see FIG. 3). Pilot air supplied to the pilot valve 151 by a line 151a when the pilot valve 151 is open will pass through a line 165a to the normally closed pilot valve 165 which is the heads down control valve. Likewise, pilot air will be supplied by a line 161a to the heads up control valve 161. A line 161b leads from the heads up pilot valve 161 to a pilot operated valve 161c and through a branch line 165b to a second pilot operated valve 165c. The pilot operated valves 161c and 165c are adapted to cause simultaneous actuation of the head cylinders in opposite directions and illustratively only one of such cylinders 24 is shown in FIG. 17. Accordingly, power air is supplied to pilot operated vavle 161c by a line 161d and such power air is conducted to the head cylinders 24 to raise the heads by means of a line 161e. It will be noted in this connection that in one position of the pilot operated valve 161c, power air from line 161d will pass through the valve 161c to the head cylinders, while in the other position of the pilot operated valve 161c air will be exhausted through line 161e, so that the head cylinders may be lowered. Lowering of the head cylinders is positively effected by means of power air supplied through a supply line 165d to the pilot operated valve 165c, there being a line 165e leading from the valve 165c to the upper end of the head cylinders 24 so as to positively move the same downwardly.

Leading from the heads down pilot valve 165 is a control line 165f having a branch 165g leading to the pilot operated valve 165c and a branch 165h leading to the pilot operated valve 161c. Pilot air supplied through the line 165f when the pilot valve 165 is open, will be seen to condition pilot operated valve 161 so that air will be exhausted from the lower end of the head cylinders 24 through line 161e, while at the same time pilot operated valve 165c will be conditioned so that power air will be supplied to the upper end of the head cylinders 24. Conversely, upon opening of the pilot valve 161, pilot air will be supplied to the pilot operated valve 161c through line 161b to condition the valve 161c so that power air will be supplied through line 161d and line 161e to the lower end of the head cylinders 24, while at the same time, pilot air will pass through line 165b to valve 165c so that the latter will be conditioned to exhaust air from the upper end of the head cylinders 24.

Figure 18:
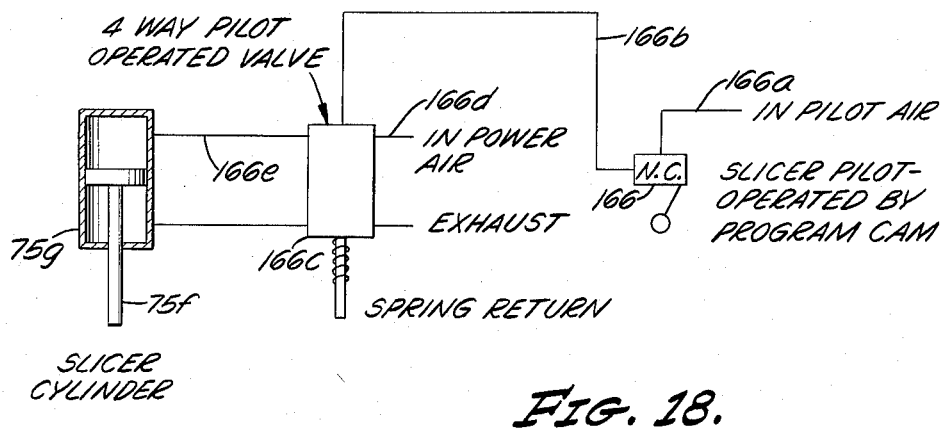
FIG. 18 is a diagrammatic view illustrating the slicer control system.

Referring now to FIG. 18, wherein there is illustrated the control system for the slicer mechanism whereby actuation of the fluid pressure operated cylinder 75g is effected, it will be noted that this system includes the slicer control element 166 which is in the nature of a normally closed pilot valve to which is applied pilot air through a line 166a. From the pilot valve 166 extends a line 166b, this line leading to a pilot operated valve 166c, which controls the flow of power air to and exhaust of power air from the slicer actuator cylinder 75g. Preferably the valve 166c is pilot air operated in one direction so as to allow the passage of power air from a supply line 166d through a line 166e into the cylinder 75g so as to cause the rod 75f to be projected from the cylinder, and the valve 166c is normally spring biased in the other direction so that power air is supplied to the cylinder 75g to retract the rod 75f.

Therefore, the period of a cycle of the fruit slicing mechanism and more particularly the operation of the pusher arms 75b from the uppermost position shown in FIG. 5 to the lowermost position shown in FIG. 7, is a function of the period during which the normally closed valve 166 is held open. Thus, as hereinabove described, the slicer control valve 166 is operable by the elongated cam block 172 on the revolving arm 170 so that the valve 166 will be held open for the desired period. Upon relief of pilot air supplied through line 166b to the pilot operated valve 166c and the supply of power air from the valve 166c to the opposite end of the slicer 75g, then, of course, the pusher arms will be moved to the starting position of FIG. 5.

Figure 19:
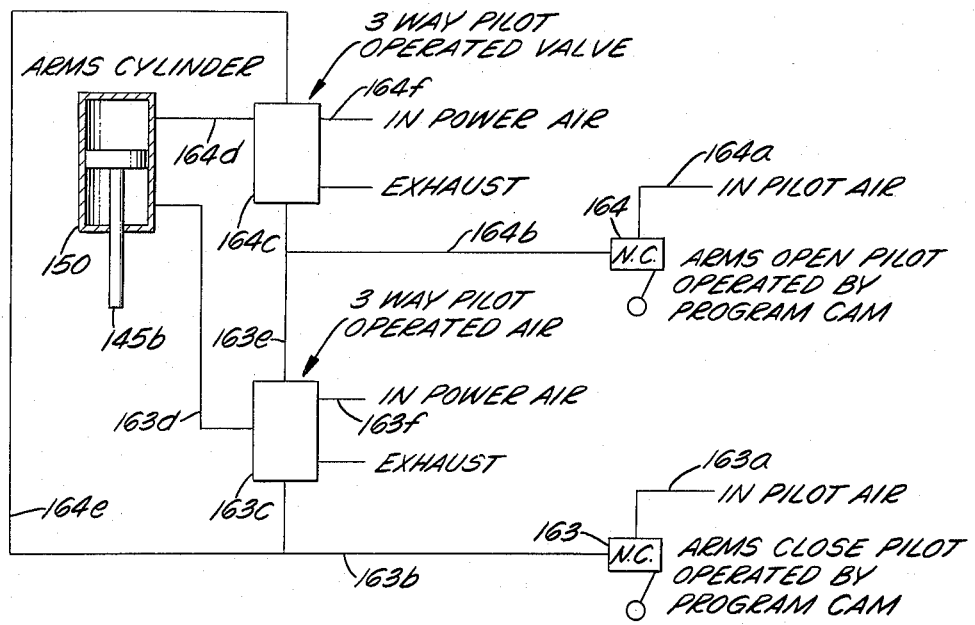
FIG. 19 is a diagrammatic view illustrating the positioning arms control system.

Referring now to the control system shown in FIG. 19 for effecting operation of the positioning fingers 135e and 136e so that they will be moved between the open position shown in FIG. 9 and the closed position shown in FIG. 10 upon operation of the actuator cylinder 150 to project the rod 145b therefrom, it will be noted that the control elements 163 and 164 are constituted by normally closed pilot valves. Pilot air is supplied by line 163a to the normally closed pilot valve 163 and when this pilot valve is open, air will pass through a line 163b to a pilot operated power air control valve 163c from which a line 163d leads to one end of the cylinder 150. Similarly, pilot air is supplied through line 164a to the normally closed pilot valve 164, which, when open, will allow air to pass through a line 164b which leads to a pilot operated power air control valve 164c, and a line 164d leads from the valve 164c to the other end of the cylinder 150. From the line 163b extends a line 164e which leads to the pilot operated valve 164c, and from the line 164b extends a line 163e which leads to the pilot operated valve 163c. The valve 163c is such that when the pilot valve 163 is caused to open, pilot air supplied through line 163b will condition the pilot operated valve 163c so that power air will flow through the same from a supply line 163f to the aforementioned line 163d to the actuator cylinder. At the same time, pilot air will pass through line 164e to the valve 164c to condition the same so that the other end of the cylinder 150 will be exhausted. Likewise, when pilot valve 164 is open, pilot air supplied to the pilot operated valve 164c through line 164b will condition the valve 164c so that power air supplied through a supply line 164f will pass through line 164d to the actuator cylinder 150, and at the same time, pilot air will flow to the pilot operated valve 163 through the branch line 163e to condition the valve 163c to exhaust the other end of the cylinder 150.

In the operation of the machine, fruit is loaded into the chute 100 which may be, if desired, provided with a pivoted gate 100a and when this gate is opened, the fruit will be allowed to move against the stop 91 with one fruit resting in each of the loading cups 87. The machine may then be turned on by energizing the source of power M, and provided there is sufficient air pressure to effect engagement of the clutch 56 at the lower end of the drive shaft 51, the machine will commence its sequential operation which involves the programmed actuation of the various control systems responsive to the control means C. It will be understood that when the source of power M is energized, the drive shafts 26 will be caused to continuously rotate and through the head driving sprockets 32 and 33 and chain 31, the four head shafts 21 will be caused to continuously rotate the heads 20. Similarly, the control arm 170 of the control means C will continuously revolve to sequentially engage the control elements 161 through 166, and for each revolution of drive shaft 51, Geneva drive pin 60 will engage Geneva wheel 61 to effect a quarter revolution of indexing shaft 55 so that the positioning head 120 will rotate one quarter revolution per revolution of the control arm 170.

Assuming for the purpose of description that the heads are down and the slicer control operating cam block 172 first contacts the control element 166 to open the same, pilot air will be supplied to the pilot operated valve 166c, as shown in FIG. 18, so that power air will be supplied to the slicer cylinder 75g to cause the rod 75f to be projected therefrom.

Referring to FIGS. 5, 6 and 7, it will be observed that the progressive projection of the rod 75f from the cylinder 75g will rock the crank arm 75e about shaft 75 and at the same time crank lever 75k and drag link 75m connected to crank lever 75n will cause the pusher arms 75b to be simultaneously moved progressively downward to the position shown in FIG. 7. At the same time, when the pin 77j on the crank arm 77k reaches the end of the lost motion slot 77h in link 77g, the loading cups 87 will be caused to move to the position shown in FIG. 7 so as to move the fruit over the stop members 91 into the guide cups 85 which have been moved upwardly by crank arms 85d, links 85c, and levers 85b to receive the fruit, as shown in FIG. 7. Thereafter, when control arm 170 allows the pilot valve 166 to close so that the pilot operated valve 166c directs power air to cylinder 75g to retract the rod 75f, whereby the slicer means will resume the position shown in FIG. 5, the fruit will be dumped from the guide cups 85 into the centering cups 77c. The centering cups 77c will hold the fruit in position upon the knife 105 so that upon the next cycle of the fruit slicing means, the arms 75b and more particularly the fruit engaging roller 75d will force the whole fruit downwardly over the knives 106 to sever the same in half as shown in FIG. 7, and the fruit halves will then gravitate down the opposing side of the guides 107, and will come to rest on the delivery decks 108 adjacent the stops 109, as also shown in FIG. 9. Of course, during the cutting of the fruit as just described, the next fruit will be transferred over the stops 91 into the guide cups for ultimate delivery to the cutting knife assembly 105. It should be noted that during movement of the whole fruit over the cutting knives 106, the centering cups 77c are yieldably held by the springs 77n in engagement with the fruit, and fruit of different sizes may cause the cups 77c to spread apart more or less as permitted by the lost motion slot 77h in the link 77g.

Now assuming that a pair of fruit have been cut to provide four fruit halves located on the delivery decks 108, as shown in FIG. 9, further revolution of the control arm 170 will bring the operator bar 171 into contact with the heads up control 161 so as to open this normally closed pilot valve. At this time, the pilot operated valve 161c will be conditioned so that power air will be supplied through line 161e to raise the heads 120.

Further movement of the control arm 170 will bring the actuator bar 171 into contact with the control pilot valve 162 in the clutch control system, with the result that pilot air will be allowed to pass through line 162d to each of the control or safety valves 22c operable by the cams 22a supported on the universal connectors 22, and if none of the valves 22c is open, indicating that all of the heads are up, then power air will continue to maintain the air clutch 56 in engagement. However, should one or more of the heads for one reason or another not be elevated, then pilot air will pass through the respective safety valve 22c to the pilot operated valve 162f to cause the power air to be exhausted from the clutch, thereby interrupting further operation of the machine.

Figure 11:
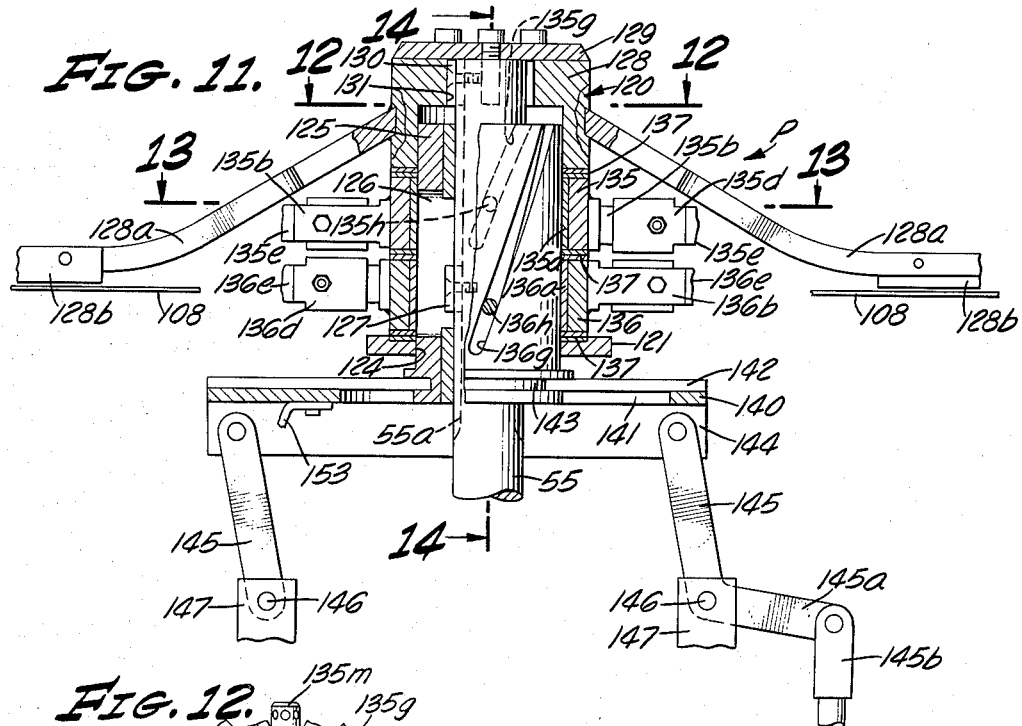
FIG. 11 is an enlarged fragmentary detail view of the positioning arm operating means.
Figure 12:
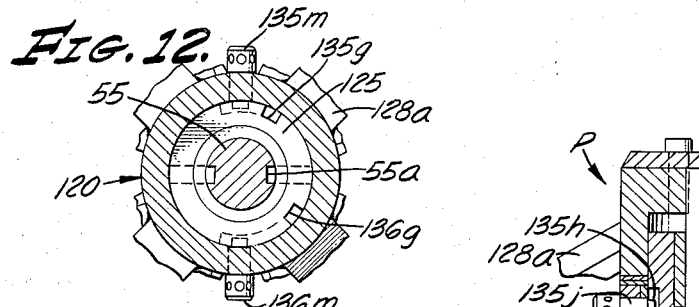
FIG. 12 is a view in horizontal section as taken on the line 12—12 of FIG. 11.
Figure 13:
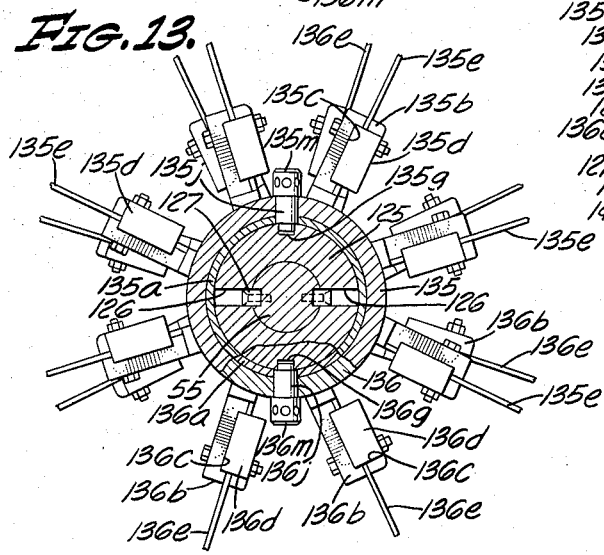
FIG. 13 is a horizontal sectional view as taken on the line 13—13 of FIG. 11.

Next, the further revolution of the control arms 170 will cause the bar 171 to open the close arms control valve 163, whereby the pilot operated valve 163c will be operated to admit air to the cylinder 150 to cause the operating rod 145b to be projected from the cylinder 150, as seen in FIG. 11. Such projection of the rod 145b will cause a counterclockwise pivotal motion of the links 145 and elevation of the slide plate 140 with the result that the bushing 125 will be caused to rise within the head 120. Upward movement of the bushing 125 will cause relative angular motion of the finger or positioning arm support rings 135 and 136 by virtue of engagement of the cam followers 135h and 136h carried thereby in the oppositely leading helical cam slots 135g and 136g. Such angular movement of the rings 135 and 136 will cause movement of the pairs of positioning fingers or arms 135e and 136e from the position shown in FIG. 9 to the positions shown in FIG. 10, whereby to engage and grip the fruit halves on the delivery decks 108 between the end portions 135f and 136f of the fingers or arms so that the fruit halves will be positioned in a predetermined radial position relative to the center of the mechanism. At this time, the Geneva drive pin 60 engages the Geneva wheel 61 to effect indexing of the indexing shaft 55 through one quarter of a revolution so that the fruit halves previously engaged by the positioning fingers or arms 135e and 136e on the delivery decks 108 will be moved through 90° to the positions shown in FIG. 10 overlying the grids 8.

Thereupon, the operating bar 171 on control arm 170 will operate the arms open control pilot valve 164 so that pilot air will be supplied to the pilot operated valve 164c, and power air will be supplied through line 164d to the cylinder 150 to cause projection of the rod 145b from the cylinder 150 so that the parallel link mechanism comprising the links 145 will be moved from the arms closed position of FIG. 11 to the position shown in FIG. 3 at which the arms are open.

Now, as the actuator bar 171 continues to revolve with control arm 170, the lower heads control pilot valve 165 will be opened and provided the safety valve 151, which is closed when the arms are closed, is open due to engagement of the member 153 carried by the plate 140 of the parallel link mechanism, then pilot air will be supplied through line 165f to the pilot operated valve 165c. At this time air will be supplied to the head cylinders to cause the revolving heads to be lowered forcefully into engagement with the fruit halves previously positioned on the grids 8, the pressure of air within the cylinders 24 and the cross sectional area of the cylinders determining the pressure applied to the fruit halves. The heads 20 will remain in contact with the fruit on the grids 8 until such time as the control arm 170 brings the actuator bar 171 into engagement with the heads up control valve 161 to effect operation thereof as previously described.

Of course, in the meantime, the slicer control valve 166 will have again been operated to effect another feeding and slicing of fruit in timed relation to the positioning and pressing of fruit between the heads 20 and the grids 8, and so on cyclically, so long as desired, to enable the squeezing of juice from a desired number of fruit.

The juice expressed from the halves on the grids 8 is adapted to flow through the discharge conduit 15 to a suitable receptacle whereat it may be, for example, weighed or otherwise treated or tested. At the same time, the squeezed fruit halves will be suitably collected after they are wiped from the grids 8 by the wipers 128b.

While specific structural details have been shown and described, it should be understood that changes and alterations may be resorted to without departing from the spirit of the invention as defined in the appended claims.

We claim:

1. A citrus fruit juice extractor, comprising: a frame;

a table on said frame having spaced grids; means for cutting whole fruit into separate sections; means for positioning the cut fruit sections on said grids; pressure applying means for pressing said fruit sections on said grids including a plurality of pressure heads respectively engageable with each fruit section; means for individually operating said heads to move the same toward and away from said grids to apply uniform pressure to the respective individual fruit sections; and control means for interrupting operation of said means for cutting whole fruit upon failure of one of said heads to move away from its grid.

2. A citrus fruit juice extractor, comprising: a frame; a table on said frame having spaced grids and fruit half delivery decks intermediate said grids; means for delivering cut fruit halves to said respective delivery decks; positioning means for engaging and moving said fruit halves from said delivery decks to said grids; individual pressure means movable toward and away from the respective grids for individually applying pressure to said fruit halves on said grids to express juice therefrom; said positioning means including means operating cyclically in timed relation to said means for delivering cut fruit halves to said delivery decks; and means for interrupting operation of said positioning means upon failure of an individual pressure means to move away from its grid.

3. A citrus fruit juice extractor, comprising: a frame; a table on said frame having spaced grids and fruit half delivery decks intermediate said grids; means for delivering cut fruit halves to said respective delivery decks; positioning means for engaging and moving said fruit halves from said delivery decks to said grids; pressure means movable toward and away from said grids for individually applying pressure to said fruit halves on said grids to express juice therefrom; said positioning means including a pair of fruit engaging elements engageable with each fruit half; means for moving said elements toward and away from one another to grip the respective fruit half on a delivery deck and to release said fruit half on a grid; and means for moving said pair of elements in unison to position said fruit half on the respective grid.

4. A citrus fruit juice extractor as defined in claim 3, wherein said fruit engaging elements comprise resilient fingers having fruit half engaging depressions.

5. A citrus fruit juice extractor as defined in claim 3, wherein said means for moving said elements towards and away from one another includes a pair of relatively movable supports for the respective elements, a member carrying said supports and movable relative thereto, and means cooperable between said member and said supports for oppositely moving said supports upon opposite movement of said member relative to said supports.

6. A citrus fruit juice extractor as defined in claim 3, wherein said means for moving said elements toward and away from one another includes a pair of relatively rotatable rings, one element of said pair being carried by one ring and the other element being carried by the other ring, a member reciprocable within said rings, coengaged means on said member and said rings for effecting opposite angular movement of said rings upon relative reciprocation of said rings and said member, and means for effecting such relative reciprocation of said member and said rings.

7. A citrus fruit juice extractor as defined in claim 3, wherein said means for moving said elements toward and away from one another includes a pair or relatively rotatable rings, one element of said pair being carried by one ring and the other element being carried by the other ring, a member reciprocable within said rings, coengaged means on said member and said rings for effecting opposite angular movement of said rings upon relative reciprocation of said rings and said member, means for effecting such relative reciprocation of said member and said rings, and said means for moving said elements in unison includes means for rotating said member.

8. A citrus fruit juice extractor as defined in claim 3, wherein said means for moving said elements toward and away from one another includes a pair of relatively rotatable rings, one element of said pair being carried by one ring and the other element being carried by the other ring, a member reciprocable within said rings, coengaged means on said member and said rings for effecting opposite angular movement of said rings upon relative reciprocation of said rings and said member, means for effecting such relative reciprocation of said member and said rings including a slide, means slidably connecting said slide and said member, and means for moving said slide in an arc.

9. A citrus fruit juice extractor as defined in claim 3, wherein said means for moving said elements toward and away from one another includes a pair of relatively rotatable rings, one element of said pair being carried by one ring and the other element being carried by the other ring, a member reciprocable within said rings, said member and said rings having opposite cam and follower means for effecting opposite angular movement of said rings upon relative reciprocation of said rings and said member, and means for effecting such relative reciprocation of said member and said rings.

10. A citrus fruit juicing machine as defined in claim 3, wherein said means for moving said elements toward and away from one another and said means for moving said elements in unison comprise a bushing, a shaft drivingly engaged with said bushing, a pair of rings about said bushing, one of said elements of said pair being carried by one ring and the other of said elements being carried by the outer ring, said bushing and said rings having coengaged means for effecting opposite angular movement of said rings upon reciprocation of said bushing in said rings, means for reciprocating said bushing, and means for effecting angular movement of said shaft.

11. A citrus fruit juice extractor, comprising: a frame; a table on said frame having spaced grids and fruit half delivery decks intermediate said grids; means for delivering cut fruit halves to said respective delivery decks; positioning means for engaging and moving said fruit halves from said delivery decks to said grids; pressure means movable toward and away from said grids for individually applying pressure to said fruit halves on said grids to express juice therefrom; said positioning means including a pair of fruit engaging elements engageable with each fruit half; means for moving said elements toward and away from one another to grip the respective fruit half on a delivery deck and to release said fruit half on a grid; means for moving said pair of elements in unison to position said fruit half on the respective grid; and wiper means for wiping said grids upon movement of said elements in unison.

12. A citrus fruit juice extractor as defined in claim 11, wherein said means for moving said elements toward and away from one another includes a pair of relatively movable supports for the respective elements, a member carrying said supports and movable relative thereto, means cooperable between said member and said supports for oppositely moving said supports upon opposite movement of said member relative to said supports, said means for moving said elements in unison includes means for rotating said member, and said wiper means being carried by said means for rotating said member.

13. Positioning means for moving cut fruit halves on a work table, comprising: a bushing; a shaft extending through said bushing; a pair of rings rotatable on said bushing; a plurality of fruit half engaging elements projecting outwardly from each rings and movable as pairs toward and away from the elements on the opposite ring upon relative angular movement; means on said rings and said bushing for effecting such angular movement of said rings upon longitudinal movement of said bushing in said rings; and means for effecting longitudinal movement of said bushing.

14. Positioning means for moving cut fruit halves on a work table, comprising: a bushing; a shaft extending through said bushing; a pair of rings rotatable on said bushing; a plurality of fruit half engaging elements projecting outwardly from each ring and movable as pairs toward and away from the elements on the opposite ring upon relative angular movement; means on said rings and said bushing for effecting such angular movement of said rings upon longitudinal movement of said bushing in said rings; means for effecting longitudinal movement of said bushing; a plurality of wiper arms projecting from said shaft to wipe said table upon rotation of said shaft; said arms extending between an element of one pair and the adjacent element of another pair.

15. Positioning means for moving cut fruit halves on a work table, comprising: a bushing; a shaft extending through said bushing; a pair of rings rotatable on said bushing; a plurality of fruit half engaging elements projecting outwardly from each ring and movable as pairs toward and away from the elements on the opposite ring upon relative angular movement; means on said rings and said bushing for effecting such angular movement of said rings upon longitudinal movement of said bushing in said rings; and means for effecting longitudinal movement of said bushing including a slide shiftably connected to said bushing and means for effecting arcuate movement of said slide relative to said rings.

16. A citrus fruit juice extractor, comprising: a frame; a table on said frame having a grid for receiving cut fruit halves; means for applying pressure to the cut fruit halves on said grid; means for delivering cut fruit halves to said grid from a whole fruit supply including a loading cup for receiving whole fruit; a pair of centering cups; means movably mounting said centering cups for retraction; knife means between said centering cups; means for operating said loading cup to displace a whole fruit therefrom into said centering cups; and means for pushing said whole fruit past said knife means between said centering cups and causing retraction of said centering cups as said whole fruit is pushed past said knife means.

17. A citrus fruit juice extractor, comprising: a frame; a table on said frame having a grid for receiving cut fruit halves; means for applying pressure to the cut fruit halves on said grid; means for delivering cut fruit halves to said grid from a whole fruit supply including means for feeding fruit from said supply; a loading cup for receiving whole fruit; a pair of centering cups; means movably mounting said centering cups for retraction; knife means between said centering cups; means for operating said loading cup to displace a whole fruit therefrom into said centering cups; means for interrupting the feed of fruit upon operation of said loading cup; and means for pushing said whole fruit past said knife means between said centering cups and causing retraction of said centering cups as said whole fruit is pushed past said knife means.

18. A citrus fruit juice extractor as defined in claim 17 including stop means interposed in the path of whole fruit adjacent said loading cup to retain a whole fruit in said loading cup; and means for operating said loading cup including means for moving the loading cup relative to said stop means to move a whole fruit past said stop means.

19. A citrus fruit juice extractor, comprising: a frame; a table on said frame having a grid for receiving cut fruit halves; means for applying pressure to the cut fruit halves on said grid; means for delivering cut fruit halves to said grid from a whole fruit supply including a loading cup for receiving whole fruit; a pair of centering cups; knife means between said centering cups; means for operating said loading cup to displace a whole fruit therefrom into said centering cups; means for pushing said whole fruit past said knife means between said centering cups; means resiliently biasing said centering cups toward one another as said whole fruit is moved past said knife means to maintain said fruit centered on said knife means; and means for positively moving said centering cups away from one another as said fruit passes said knife means.

20. A citrus fruit juice extractor as defined in claim 19 wherein the means for positively moving said centering cups away from one another comprises a lost motion connection with said means for pushing said whole fruit past said knife means.

21. A citrus fruit juice extractor as defined in claim 16 wherein said means for pushing said whole fruit past said knife means comprises a pair of pusher arms respectively located at opposite sides of said knife means; means for moving said pusher arms in unison relative to said knife means; said means for operating said loading cup including means interconnected with and operable upon movement of said pusher arms.

22. A citrus fruit juice extractor as defined in claim 16 including a pair of pusher arms disposed at opposite sides of said knife means; means for moving said pusher arms in unison relative to said knife means including actuator means connected to one of said pusher arms; and means operatively interconnecting said pusher arms for movement in unison responsive to operation of said actuator means.

23. A citrus fruit juice extractor, comprising: a frame; a table on said frame having a grid for receiving cut fruit halves; means for applying pressure to the cut fruit halves on said grid; means for delivering cut fruit halves to said grid from a whole fruit supply including centering means; means for feeding successive whole fruit to said centering means; knife means centrally located with respect to said centering means; means for pushing said whole fruit past said knife means between said centering means; said means for pushing said whole fruit comprising a pair of pusher arms; a support for each pusher arm; means for moving said pusher arms in unison to push said whole fruit past said knife means; said centering means being retractible from a position for receiving said whole fruit and means operable upon such movement of said pusher arms to retract said centering means.

24. A citrus fruit juice extractor, comprising: a frame; a table on said frame having a grid for receiving cut fruit halves; means for applying pressure to the cut fruit halves on said grid; means for delivering cut fruit halves to said grid from a whole fruit supply including a loading cup for receiving whole fruit; a pair of centering cups; knife means between said centering cups; a guide cup adjacent said loading cup and means for operating said loading cup to displace said whole fruit from said loading cup into said guide cup; said guide cup being movable from a fruit receiving position to a position to place said whole fruit between said centering cups; means for pushing said whole fruit past said knife means between said centering cups; and means for moving said guide cup as aforesaid upon movement of said pusher arms to push a fruit past said knife means.

25. A citrus fruit juice extractor, comprising: a frame; a table on said frame having a grid for receiving cut fruit halves; means for applying pressure to the cut fruit halves on said grid; means for delivering cut fruit halves to said grid from a whole fruit supply including a loading cup for receiving whole fruit; a pair of centering cups; knife means between said centering cups; a guide cup interposed between said loading cup and said centering cups; means for operating said loading cup to place a whole fruit in said guide cup; means for operating said guide cup to place said whole fruit in said centering cups; and means for pushing said whole fruit past said knife means between said centering cups.

26. A citrus fruit juice extractor as defined in claim 25, including pairs of spaced shafts as opposite sides of said knife means; said loading cup and said guide cup being pivotally mounted on one of said shafts; said pusher means comprising arms respectively pivotally mounted on one of said shafts of each pair; one of said centering cups being carried by said loading cup and the other of said centering cups being mounted on another of said shafts; means interconnecting said pusher arms for movement in unison; actuator means for moving one of said pusher arms to effect movement of said pusher arms; means interconnecting said centering cups for movement in unison; means interconnecting said pusher arms with one of said centering cups for movement of said centering cups following a predetermined movement of said pusher arms in a direction to push a whole fruit past said knife means; and means connecting said loading cup with said pusher arms to move said loading cup to a position to load a whole fruit in said guide cup upon movement of said pusher arms in a direction to push a whole fruit past said knife means.

27. A citrus fruit juice extractor as defined in claim 26 including means for feeding a continuous supply of fruit to said loading cup; and means operable by said loading cup to interrupt said supply upon movement of said loading cup to said position for placing a fruit in said guide cup.

28. A citrus fruit juice extractor, comprising: a frame; a table on said frame having a grid for reception of a cut fruit half; pressure applying means carried by said frame; said pressure applying means including a pressure disk; means for effecting continuous rotation of said disk; means for effecting reciprocation of said disk toward and away from said grid; a shaft supporting said disk on said frame; a rotary driver slidably engaged with said shaft; and means for effecting reciprocation of said shaft; said rotary driver including a bearing support carried by said frame; driven means supported in said bearing; and means slidably interconnecting said driven means and said shaft.

29. A citrus fruit juice extractor, comprising: a frame; a table on said frame having angularly spaced grids and cut fruit delivery decks between said grids; means for bisecting whole fruit and delivering cut fruit halves to said delivery decks; positioning means for engaging and moving said cut fruit halves from said delivery decks to said grids; pressure applying means for engaging said cut fruit halves on said grids to rotate and apply pressure thereto to express juice therefrom; means for operating said bisecting means, said positioning means, and said pressure applying means in timed relation to successively bisect and express the juice from a supply of whole fruit, including means for effecting reciprocation of said pressure applying means toward and away from said grids; means for operating said positioning means to move cut fruit halves onto said grids while said pressure applying means are spaced from said grids; and means for operating said bisecting means while said pressure applying means are engaged with said fruit halves on said grids.

30. A citrus fruit juice extractor as defined in claim 29, including control means for the respective means for effecting reciprocation of said pressure applying means and the means for operating said bisecting means; and means for sequentially operating said control means in timed relation to operation of the means for operating said positioning means.

31. A citrus fruit juice extractor as defined in claim 29, including control means for the respective means for effecting reciprocation of said pressure applying means and the means for operating said bisecting means; means for sequentially operating said control means in timed relation to operation of the means for operating said positioning means; and means for interrupting operation of said positioning means upon failure of one of said pressure applying means to move away from its grid.

32. A citrus fruit juice extractor as defined in claim 29, including control means for the respective means for effecting reciprocation of said pressure applying means and the means for operating said bisecting means; means for sequentially operating said control means in timed relation to operation of the means for operating said positioning means; said positioning means including a positioning shaft; a power shaft; means cooperative between said shafts for effecting intermittent rotation of the positioning shaft responsive to continuous rotation of said power shaft; said respective control means including control elements disposed in angularly spaced relation about said power shaft; and an operator for said control elements rotatable with said power shaft and successively engageable with said control elements.

33. A citrus fruit juice extractor as defined in claim 29, including control means for the respective means for effecting reciprocation of said pressure applying means and the means for operating said bisecting means; means for sequentially operating said control means in timed relation to operation of the means for operating said positioning means; said positioning means including a positioning shaft; a power shaft; one of said shafts having a Geneva wheel thereon and the other of said shafts having a drive pin intermittently engageable with said Geneva wheel to effect intermittent rotation of said positioning shaft; said respective control means including control elements disposed in angularly spaced relation about said power shaft; and an operator for said control elements rotatable with said power shaft and successively engageable with said control elements.

34. A citrus fruit juice extractor as defined in claim 29, including control means for the respective means for effecting reciprocation of said pressure applying means and the means for operating said bisecting means; means for sequentially operating said control means in timed relation to operation of the means for operating said positioning means; said positioning means including a positioning shaft; a power shaft; means cooperative between said shafts for effecting intermittent rotation of the positioning shaft responsive to continuous rotation of said power shaft; said respective control means including control elements arranged in spaced relation; and means operable to successively operate said control elements as said rotatable shaft rotates.

35. A citrus fruit juice extractor as defined in claim 29, including control means for the respective means for effecting reciprocation of said pressure applying means and the means for operating said bisecting means; means for sequentially operating said control means in timed relation to operation of the means for operating said positioning means; said positioning means including a positioning shaft; a power shaft; means cooperative between said shafts for effecting intermittent rotation of the positioning shaft responsive to continuous rotation of said power shaft; said respective control means including control elements arranged in spaced relation; and means operable to successively operate said control elements as said rotatable shaft rotates; means for effecting rotation of said power shaft including a normally engaged clutch and means for causing said clutch to be disengaged upon failure of one of said pressure applying means to move away from its grid.

36. A citrus fruit juice extractor as defined in claim 29, including control means for the respective means for effecting reciprocation of said pressure applying means and the means for operating said bisecting means; means for sequentially operating said control means in timed relation to operation of the means for operating said positioning means; said positioning means including a positioning shaft; a power shaft; means cooperative between said shafts for effecting intermittent rotation of the positioning shaft responsive to continuous rotation of said power shaft; said respective control means including control elements arranged in spaced relation; and means operable to successively operate said control elements as said rotatable shaft rotates; means for effecting rotation of said power shaft including a normally engaged clutch and means for causing said clutch to be disengaged upon failure of one of said pressure heads to move away from its grid; said means for causing said clutch to be disengaged including a control element disposed in the path of said means for operating the control elements aforesaid and operable following operation of the control element for moving said heads away from said grids.

37. A citrus fruit juice extractor, comprising: a frame; a table on said frame having angularly spaced grids and cut fruit delivery decks between said grids; means for bisecting whole fruit and delivering cut fruit halves to said delivery decks; positioning means including a pair of arms engagebale with each fruit half and movable angularly in unison when engaged with said fruit halves for moving said fruit halves from said delivery decks to said grids; pressure applying means movable toward and away from said grids for engaging said cut fruit halves on said grids to rotate and apply pressure thereto to express juice therefrom; means for operating said bisecting means, said positioning means, and said pressure applying means in timed relation to successively bisect and express the juice from a supply of whole fruit, including means for effecting reciprocation of said pressure applying means toward and away from said grids; means for closing said arms on said fruit halves and opening said arms while said pressure applying means are spaced from said grids; mean for moving said arms angularly in unison while closed for moving said fruit halves onto said grids; and means for operating said bisecting means while said pressure applying means are engaged with said fruit halves on said grids.

38. A citrus fruit juice extractor, comprising: a frame; a table on said frame having angularly spaced grids and cut fruit delivery decks between said grids; means for bisecting whole fruit and delivering cut fruit halves to said delivery decks; positioning means including a pair of arms engageable with each fruit half and movable angularly in unison when engaged with said fruit halves for moving said fruit halves from said delivery decks to said grids; pressure applying means movable toward and away from said grids for engaging said cut fruit halves on said grids to rotate and apply pressure thereto to express juice therefrom; operator means for said bisecting means; operator means for said pressure applying means; operator means for closing said arms and for opening asid arms; control means for the respective operator means including a control element for causing said pressure applying means to be moved away from said grids; a control element for causing said arms to be closed; a control element for causing said arms to be opened; a control element for causing said pressure applying means to be moved toward said grids; a control element for causing operation of said bisecting means; said control elements being arranged in sequence; a source of power; means driven by said source of power for sequentially operating said control elements; and means operable by said source of power to move said arms in unison as aforesaid while said arms are closed.

39. A citrus fruit juice extractor as defined in claim 38 including a normally engaged clutch interposed between said source of power and said arms; a clutch control element interposed between said control element for causing said pressure applying means to be moved away from said grids and said control element for causing said arms to be closed to cause said clutch to be disengaged for interrupting the sequential operation of said control elements upon failure of one of said pressure applying means to move away from its grid.

40. A citrus fruit juice extractor as defined in claim 39 wherein each of said operator means includes fluid pressure operated rams and each of said control elements comprises pilot valve means for controlling the application of fluid pressure to said rams.

41. A citrus fruit juice extractor, comprising: a frame; a table on said frame having angularly spaced grids and cut fruit delivery decks; means for simultaneously bisecting a plurality of whole fruit and delivering cut fruit halves to said delivery decks; positioning means including fruit half engaging elements engageable with the respective halves and movable angularly in unison when engaged with said fruit halves for moving the latter from said delivery decks to said grids; a plurality of reciprocal rotary pressure applying heads movable toward and away from the respective grids to engage each fruit half and express juice therefrom; means for causing continuous rotation of said heads; means for effecting intermittent reciprocation of said heads toward and away from said grids; means for operating said positioning means to engage and move fruit halves to said grids while said heads are spaced from said grids; and means for operating said bisecting means while said heads are in engagement with said fruit halves on said grids.

42. A citrus fruit juice extractor, comprising: a frame; a table on said frame having angularly spaced grids and cut fruit delivery decks; means for simultaneously bisecting a plurality of whole fruit and delivering cut fruit halves to said delivery decks; positioning means including fruit half engaging elements engageable with the respective halves and movable angularly in unison when engaged with said fruit halves for moving the latter from said delivery decks to said grids; a plurality of reciprocal rotary pressure applying heads movable toward and away from the respective grids to engage each fruit half and express juice therefrom; means for causing continuous rotation of said heads; means for effecting intermittent reciprocation of said heads toward and away from said grids; means for operating said positioning means to engage and move fruit halves to said grids while said heads are spaced from said grids; means for operating said bisecting means while said heads are in engagement with said fruit halves on said grids; and means for interrupting operation of said positioning means upon failure of one of said heads to move away from its grid.

43. A citrus fruit juice extractor, comprising: a frame; a table on said frame having spaced flat grid portions; means for cutting whole fruit to provide cut fruit sections and for delivering cut fruit sections to said table in spaced relation to said grid portions; positioning means for moving said fruit sections on said table to said grid portions; pressure applying means for pressing said fruit sections on said grid portions including rotatable pressure heads engageable with said fruit sections; said positioning means including means for centering said fruit sections on said grid portions in axial alignment with said pressure heads; means for individually operating said heads to move the same toward and away from said grid portions; said means for operating said heads including a fluid pressure responsive actuator connected to each head for applying uniform pressure to the respective fruit sections upon movement toward said grid portions; and means for rotating said heads to rotate said fruit sections on said grids.

44. A citrus fruit juice extractor, comprising: a frame; a table on said frame having spaced flat grid portions; means for cutting whole fruit to provide cut fruit sections and for delivering cut fruit sections to said table in spaced relation to said grid portions; positioning means for moving said fruit sections on said table to said grid portions; pressure applying means for pressing said fruit sections on said grid portions including rotatable pressure heads engageable with said fruit sections; said positioning means including means for centering said fruit sections on said grid portions in axial alignment with said pressure heads; means for individually operating said heads to move the same toward and away from said grid portions to apply uniform pressure to the respective individual fruit sections; said means for operating said heads including a fluid pressure responsive actuator connected to each head; and means for continuously rotating said heads; said means for rotating said heads including driver means for effecting rotation of said heads and a slidable connection between said driver means and the respective head to permit said movement of said heads toward and away from said grid portions during said continuous rotation of said heads.

45. A citrus fruit juice extractor, comprising: a frame; a tabel on said frame having spaced grid portions and a fruit half delivery deck spaced from said grid portions; means for delivering cut fruit halves to said delivery deck; positioning means for engaging and moving said fruit halves from said delivery deck to said grid portions; pressure means movable toward and away from said grid portions for individually applying pressure to said fruit halves on said grid portions to express juice therefrom; said positioning means including a pair of fruit engaging elements engageable with each fruit half; means for moving said elements toward and away from one another to grip the respective fruit half on said delivery deck and to release said fruit half on a grid portion; and means for moving said pair of elements in unison to position said fruit half on the respective grid portion.

46. A citrus fruit juice extractor, comprising: a frame; a table on said frame having spaced grid portions and a cut fruit delivery deck spaced from said grid portions; means for bisecting whole fruit and delivering cut fruit halves to said delivery deck; positioning means including a pair of arms engageable with each fruit half and movable angularly in unison when engaged with said fruit halves for moving said fruit halves from said delivery deck to said grid portions; pressure applying means movable toward and away from said grid portions for engaging said cut fruit halves on said grid portions to rotate and apply pressure thereto to express juice therefrom; means for operating said bisecting means, said positioning means, and said pressure applying means in timed relation to successively bisect and express the juice from a supply of whole fruit, including means for effecting reciprocation of said pressure applying means toward and away from said grid portions; means for closing said arms on said fruit halves and opening said arms while said pressure applying means are spaced from said grid portions; means for moving said arms angularly in unison while closed for moving said fruit halves onto said grid portions; and means for operating said bisecting means while said pressure applying means are engaged with said fruit halves on said grid portions.

References Cited by the Examiner

UNITED STATES PATENTS

| 765,005 | 7/1904 | Gregory | 100—215 X |
|---|---|---|---|
| 1,053,590 | 2/1913 | Gilchrist | 100—238 X |
| 2,367,859 | 1/1945 | Fromm | 100—238 X |
| 2,552,171 | 5/1951 | Hagerty | 100—97 |
| 2,649,731 | 8/1953 | Polk et al. | 100—237 X |
| 2,667,118 | 1/1954 | Nelson | 100—218 X |
| 2,723,618 | 11/1955 | Matthews | 100—53 |

FOREIGN PATENTS

| 700,855 | 1/1931 | France. |
|---|---|---|
| 893,400 | 10/1953 | Germany. |

WALTER A. SCHEEL, *Primary Examiner.*

BILLY J. WILHITE, *Examiner.*